(12) United States Patent
Kojima et al.

(10) Patent No.: US 8,363,056 B2
(45) Date of Patent: Jan. 29, 2013

(54) CONTENT GENERATION SYSTEM, CONTENT GENERATION DEVICE, AND CONTENT GENERATION PROGRAM

(75) Inventors: Eiji Kojima, Yokohama (JP); Wai Syou, Machida (JP); Tetsuya Nakagishi, Komae (JP); Keiji Hayashi, Fuchu (JP)

(73) Assignee: Earnet Co., Ltd., Tokyo (JP)

( * ) Notice: Subject to any disclaimer, the term of this patent is extended or adjusted under 35 U.S.C. 154(b) by 321 days.

(21) Appl. No.: 12/451,619

(22) PCT Filed: May 21, 2008

(86) PCT No.: PCT/JP2008/059376
§ 371 (c)(1),
(2), (4) Date: Feb. 4, 2010

(87) PCT Pub. No.: WO2008/143297
PCT Pub. Date: Nov. 27, 2008

(65) Prior Publication Data
US 2010/0141661 A1 Jun. 10, 2010

(30) Foreign Application Priority Data
May 22, 2007 (JP) .................................. 2007-135247

(51) Int. Cl.
*G06T 15/00* (2011.01)
(52) U.S. Cl. .......... 345/473; 345/474; 345/475; 382/118
(58) Field of Classification Search .................. 345/473, 345/474, 475; 382/118
See application file for complete search history.

(56) References Cited

U.S. PATENT DOCUMENTS

| | | | | |
|---|---|---|---|---|
| 6,970,931 | B1 * | 11/2005 | Bellamy et al. | 709/227 |
| 7,937,416 | B2 * | 5/2011 | Hossfeld et al. | 707/803 |
| 8,096,882 | B2 * | 1/2012 | Jung et al. | 463/42 |

FOREIGN PATENT DOCUMENTS

| | | |
|---|---|---|
| JP | 10-200862 A | 7/1998 |
| JP | 2000-115736 A | 4/2000 |
| JP | 2002-232858 A | 8/2002 |
| JP | 2002-320192 A | 10/2002 |
| JP | 2003-281542 A | 10/2003 |
| JP | 2003-299059 A | 10/2003 |
| JP | 2005-252574 A | 9/2005 |
| JP | 2006-325156 A | 11/2006 |

OTHER PUBLICATIONS

Official Action issued Nov. 15, 2010, in counterpart Chinese patent application (with English translation of relevant parts attached), eleven (11) total pages.

* cited by examiner

*Primary Examiner* — Phu K Nguyen
(74) *Attorney, Agent, or Firm* — Nath, Goldberg & Meyer; Jerald L. Meyer; Scott C. Langford

(57) ABSTRACT

A content generation system includes a host terminal and an encode terminal. The host terminal has: a lecture material display unit for displaying a lecture material on a desk top; and a desk top image transmission unit for transmitting a desk top image. The encode terminal has: a lecturer imaging data generation unit which generates lecturer imaging data by capturing a lecture performed by the lecturer; an animation data generation unit which generates animation data from the image on the desk top received from the host terminal in synchronization with the lecturer imaging data; and a content data transmission unit which transmits content data containing the lecturer imaging data and the animation data.

8 Claims, 14 Drawing Sheets

FIG. 12
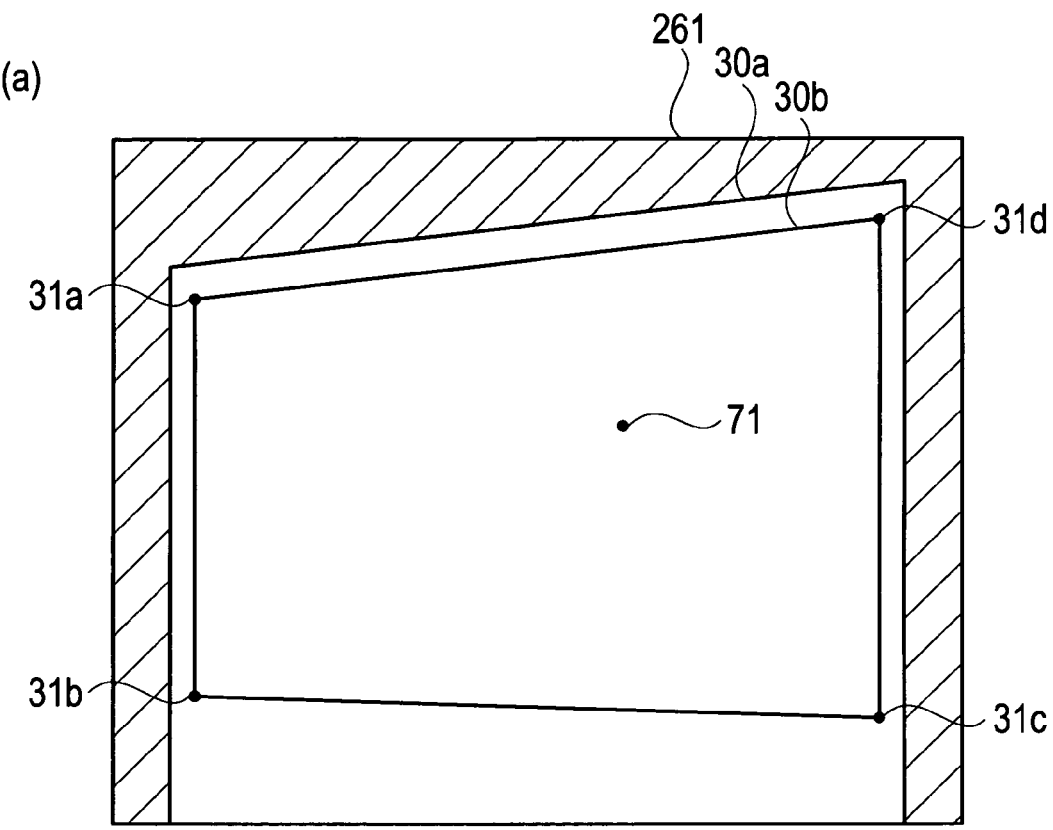
(a)
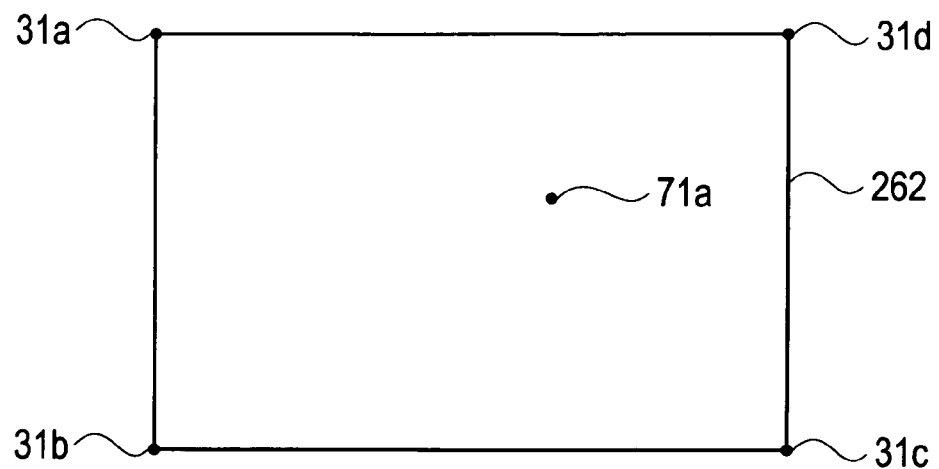
(b)

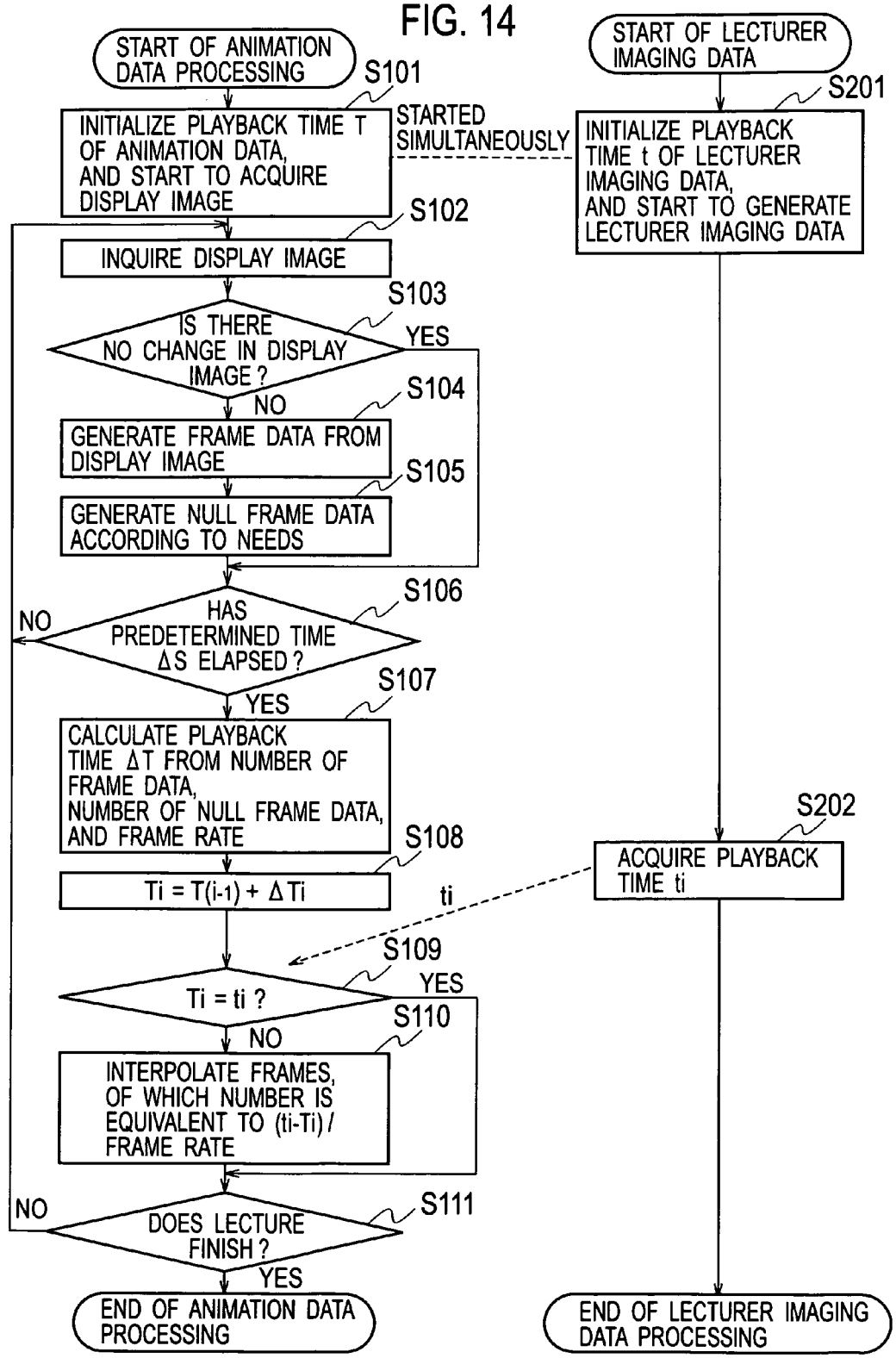

CONTENT GENERATION SYSTEM, CONTENT GENERATION DEVICE, AND CONTENT GENERATION PROGRAM

This is a National Phase Application filed under 35 U.S.C. 371 as a national stage of PCT/JP2008/059376, filed on May 21, 2008, an application claiming the benefit of Japanese Patent Application 2007-135247, filed on May 22, 2007, the content of each of which is hereby incorporated by reference in its entirety.

TECHNICAL FIELD

The present invention relates to a content generation system, a content generation device, and a content generation program, which generate, by using a computer, a content regarding a lecture performed by a lecturer.

BACKGROUND ART

Heretofore, a remote delivery system has been proposed, which captures, as video data and voice data, a content of a lecturer's lecture given on campus, in an office, at a lecture meeting, or in the like, and provides these data to a student at a remote place through a network. This remote delivery system is also called an e-learning (electronic learning) system, and can allow the student to take the lecture at any place and any time. Since the remote delivery system is easy to use, the remote delivery system is used in varieties of places and opportunities, which include a teaching site such as a college, an in-house employee education, and the like.

However, in such a method of allowing the student to take the lecture by delivering thereto a moving picture in which the lecture content is imaged, there is a problem that the student only views and listens to the monotonous lecture in a passive manner. This problem results in a motivation decrease of the student, and causes another problem that the student cannot be allowed to receive an effective education.

In this connection, there is a system that reduces a burden of a delivery operation, which is performed by the lecturer, at the time of delivering the lecture content to the student, and meanwhile, can allow the student to take a lecture closer to the actual lecture and having a feeling of presence at the time when the student takes the lecture (for example, refer to Patent Literature 1). This system described in Patent Literature 1 converts lecturer's materials into moving picture files and delivers the moving picture files to a terminal of the student in advance. When the lecture is started, the system automatically delivers, to the student, audio/video data including a video and voice of the lecturer, the number of the lecturer's material selected by the lecturer, position data of a pointer on a screen, data of characters or diagrams, which are written on a whiteboard by the lecturer, and moving picture information included in the lecturer's material.

Patent Literature 1: Japanese Patent Laid-Open Publication No. 2006-325156

DISCLOSURE OF THE INVENTION

However, the system described in the foregoing Patent Literature 1 has had a problem that the materials must be prepared in advance.

Specifically, in the case where the lecturer desires to present a new material in response to circumstances of the lecture, reactions of students in a classroom, and the like, the above-described system has had no means for distributing the material concerned to the students. Therefore, for the student who takes the lecture by such remote delivery, the lecturer has had to carry on with the lecture in accordance with the predetermined material. In such a way, the lecture cannot help being monotonous, and it has been possible that the motivation of the student may be decreased.

Accordingly, it is expected to provide a content for the lecture closer to the actual lecture and having the feeling of presence so that the motivation of the student can be maintained.

Meanwhile, it is necessary to reduce a lecturer's burden of an operation for generating the content so that the lecturer can concentrate attention on the lecture.

The present invention has been made in consideration of the above-described problems. It is an object of the present invention to provide a content generation system, a content generation device, and a content generation program, which reduce the burden of the delivery operation, which is performed by the lecturer, at the time of generating the content regarding the lecture performed by the lecturer, and can allow the student to take the lecture closer to the actual lecture and having the feeling of presence at the time when the student takes the lecture.

In order to solve the above-described problems, a first feature of the present invention relates to a content generation system that generates, by using a computer, a content regarding a lecture performed by a lecturer. Specifically, the content generation system according to the first feature of the present invention includes: a host terminal which the lecturer operates; and a content generation device connected to the host terminal. The host terminal includes: a lecture material display unit that displays a material of the lecture on a display device; and a display image transmission unit that transmits display image data displayed on the display device. The content generation device includes: a lecturer imaging data generation unit that sequentially stores lecturer imaging data, in which a lecture scene of the lecturer is imaged, in a storage device of the content generation device; and an animation data generation unit that generates, in synchronization with the lecturer imaging data, animation data from the display image data received from the host terminal, and stores the generated animation data in the storage device.

Here, the animation data may include a plurality of frame data generated from the display image data sequentially transmitted from the host terminal, and the animation data generation unit of the content generation device may calculate, at predetermined timing, a playback time of the animation data from the number of converted frame data and a frame rate, may add or delete the frame data so that the playback time can coincide with a playback time of the lecturer imaging data, and may generate the animation data.

Moreover, the content generation system may further include a client terminal connected to the content generation device and operated by a student. The content generation device may further include a content data transmission unit that reads out the lecturer imaging data and the animation data from the storage device, and transmits content data containing the lecturer imaging data and the animation data to the client terminal. The client terminal may include: a content data receiving unit that receives the content data; and a content data playback unit that plays back the content data, and outputs the content data to an output device, and at a time of playing back the content data, the content data playback unit of the client terminal changes the playback time of the animation data to the playback time of the lecturer imaging data at predetermined timing in a case where the playback time of the lecturer imaging data and the playback time of the animation data are different from each other.

A second feature of the present invention relates to a content generation device that generates, by using a computer, a content regarding a lecture performed by a lecturer. Specifically, the content generation device according to the second feature of the present invention includes: a lecturer imaging data generation unit that sequentially stores lecturer imaging data, in which a lecture scene of the lecturer is imaged, in a storage device thereof; an animation data generation unit that receives display image data, which is displayed on a display device of a host terminal which the lecturer operates, from the host terminal, generates animation data from the display image data in synchronization with the lecturer imaging data, and stores the generated animation data in the storage device; and a content data transmission unit that reads out the lecturer imaging data and the animation data from the storage device, and transmits content data containing the lecturer imaging data and the animation data.

Here, the animation data may include a plurality of frame data generated from the display image data sequentially transmitted from the host terminal, and the animation data generation unit may calculate, at predetermined timing, a playback time of the animation data from the number of converted frame data and a frame rate, may add or delete the frame data so that the playback time can coincide with a playback time of the lecturer imaging data, and may generate the animation data.

A third feature of the present invention relates to a content generation program that generates, by using a computer, a content regarding a lecture performed by a lecturer. Specifically, the content generation program allows the computer to function as: a lecturer imaging data generation unit that sequentially stores lecturer imaging data, in which a lecture scene of the lecturer is imaged, in a storage device thereof; an animation data generation unit that receives display image data, which is displayed on a display device of a host terminal which the lecturer operates, from the host terminal, generates animation data from the display image data in synchronization with the lecturer imaging data, and stores the generated animation data in the storage device; and a content data transmission unit that reads out the lecturer imaging data and the animation data from the storage device, and transmits content data containing the lecturer imaging data and the animation data.

Here, the animation data may include a plurality of frame data generated from the display image data sequentially transmitted from the host terminal, and the animation data generation unit may calculate, at predetermined timing, a playback time of the animation data from the number of converted frame data and a frame rate, may add or delete the frame data so that the playback time can coincide with a playback time of the lecturer imaging data, and may generate the animation data.

In accordance with the present invention, the content generation system, the content generation device, and the content generation program can be provided, which reduce the burden of the delivery operation, which is performed by the lecturer, at the time of delivering the lecture content to the student, and can allow the student to take the lecture closer to the actual lecture and having the feeling of presence at the time when the student takes the lecture.

BRIEF DESCRIPTION OF THE DRAWINGS

FIG. 12 is a diagram explaining processing of a pointer coordinate data generation unit according to a best embodiment of the present invention.

FIG. 14 is a flowchart explaining the processing of the animation data generation unit according to the best embodiment of the present invention.

BEST MODE FOR CARRYING OUT THE INVENTION

A description will be made below of an embodiment of the present invention with reference to the drawings.
(Content Generation System)

Figure 1:
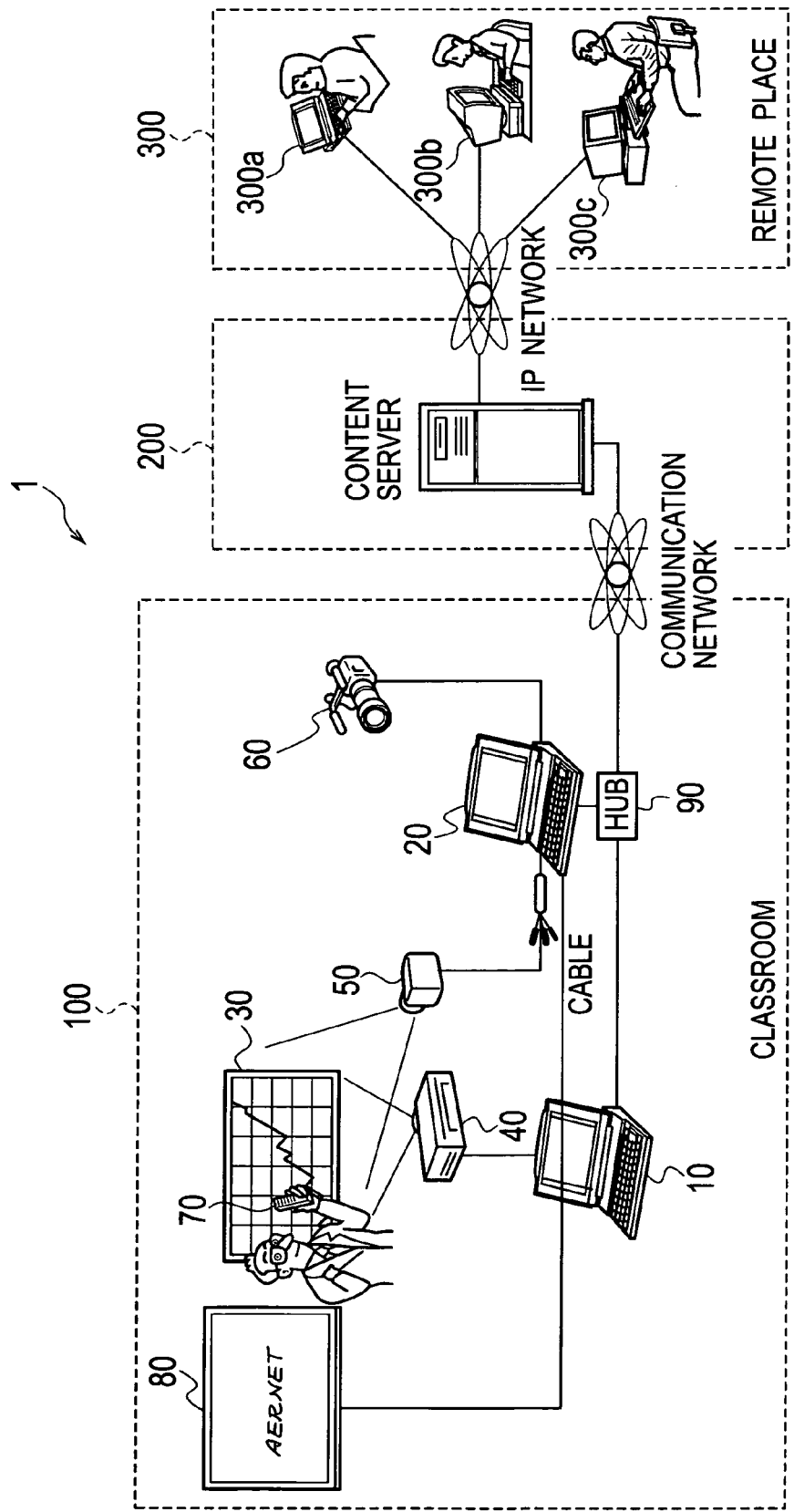
FIG. 1 is a system schematic diagram of a content generation system according to an embodiment of the present invention.

FIG. 1 is a system schematic diagram of a content generation system 1 according to the embodiment of the present invention. This content generation system 1 includes a host system 100, a content server 200 and client terminals 300. The host system 100, the content server 200 and the client terminals 300 are connected to one another through communication networks such as the Internet in accordance with internet protocol and the like. The host system 100 delivers a content of a lecture, which is given by a lecturer, to the client terminals 300 in real time, and delivers such a lecture content to the client terminals 300 in accordance with requests from the client terminals 300.
(Host System)

The host system 100 is a system installed in a classroom, a conference room or the like, where the lecturer (or a presenter) actually gives the lecture (or gives a presentation). This host system 100 includes a host terminal 10, an encode terminal (content generation device) 20 and a lecturer imaging camera 60. The host terminal 10 and the encode terminal 20 are connected to each other through a hub 90 by a LAN cable. The host system 100 may further include a screen 30, a projector 40, a pointer position detecting camera 50, a laser pointer 70 held by the hand of the lecturer, and a whiteboard 80.

The host terminal 10 is a terminal operated by the lecturer. The host terminal 10 displays a material of the lecture on a display device of the host terminal 10, and transmits image data, which is displayed on the display device, to the encode terminal 20. Here, an image displayed on the display device is an image displayed on a so-called desk top.

The host terminal 10 is connected to the projector 40 by a video cable. The projector 40 projects such a material regarding the lecture content, which is displayed on the display device of the host terminal 10, on the screen 30. The screen 30 is placed in the classroom or the like, where the host system 100 is installed.

Such an image projected on the screen 30 can be browsed by students in the classroom or the like, and sometimes becomes a subject to be imaged by the lecturer imaging camera 60 to be described later.

The encode terminal 20 is connected to the host terminal 10, and in addition, is connected to the lecturer imaging camera 60, the pointer position detecting camera 50 and the whiteboard 80.

The lecturer imaging camera 60 is a camera for imaging the lecturer. The lecturer imaging camera 60 can image the screen 30 and the whiteboard 80 according to needs. It is preferable that, following movement of the lecturer, the subject to be imaged by the lecturer imaging camera 60 be also changed. An instruction to switch an area to be imaged by the lecturer imaging camera 60 is issued from the encode terminal 20 or the like.

The pointer position detecting camera 50 images a pointer indicated on the screen 30 by the lecturer, and detects a position of the pointer. This position of the pointer is used for playing back the position of the pointer at a time of playing back the content. The pointer position detecting camera 50 is arranged by being fixed to a position from which it is possible to image the screen 30.

As a detection method of the position of the pointer, for example, there is a method that uses the laser pointer 70 including an infrared laser. This laser pointer 70 includes the infrared laser as a light source. In the pointer position detecting camera 50, a filter that transmits only infrared laser light therethrough is provided. The screen 30 is imaged by means of the pointer position detecting camera 50, whereby the pointer position detecting camera 50 can selectively image only infrared light of the laser pointer indicated on the screen 50. In accordance with the pointer position detecting camera 50 as described above, only the position of the pointer can be detected with good accuracy without being affected by disturbing light on the periphery of the screen 30.

The whiteboard 80 has functions to convert characters or diagrams, which are written on the whiteboard 80 by the lecturer, into electronic data, and to output the electronic data to the encode terminal 20. This whiteboard 80 has a configuration in which slim loop-type sensor coils of which number is approximately several ten are stacked and arranged under a board surface in a grid fashion individually in an X-axis direction and a Y-axis direction. One wound coil is embedded in a tip end of a pen used by the lecturer, and is connected to a capacitor, whereby an LC resonant circuit is formed. An alternating current is flown through such a group of the sensor coils under the board surface for a fixed time, whereby a magnetic field is generated therein in advance. When the lecturer brings the pen into contact with the board surface, an induced current flows through the pen, and is accumulated in the capacitor. Here, when the current flowing through the sensor coils under the board surface is stopped, a current flows through the coil of the pen by taking, as a source, electricity accumulated in the capacitor of the pen, whereby a magnetic field is generated therein. Moreover, an induced current flows through one of the sensor coils of the board surface by being affected by this magnetic field. Accordingly, a position of the coil through which the current has flown is detected, whereby a position (coordinate) of the pen can be known. Such detection is repeatedly performed several ten times for one second, whereby a computer can recognize the characters or the diagrams, which are written on the board surface. Note that, besides the above-described whiteboard, there is a whiteboard, in which a pressure sensor is provided in the pen in advance, and the coordinate on the board is detected based on a handwriting pressure. In this embodiment, a whiteboard having any configuration may be adopted as long as character information written on the whiteboard can be acquired by means of the computer.

(Host Terminal)

Next, a description will be made of a specific configuration of the host terminal 10 with reference to FIG. 2. The host terminal 10 is a terminal to be used by the lecturer. Specifically, the lecturer displays the materials, which the lecturer desires to present to the students during the lecture, on the display device of the host terminal 10. In such a way, the lecturer displays the image data, which is displayed on an output device 12, on the screen 30 by means of the projector 40 connected to the host terminal 10, and thereby can also present, to the students, a material that is not distributed in advance, and a material presented in response to a question or the like.

Figure 2:
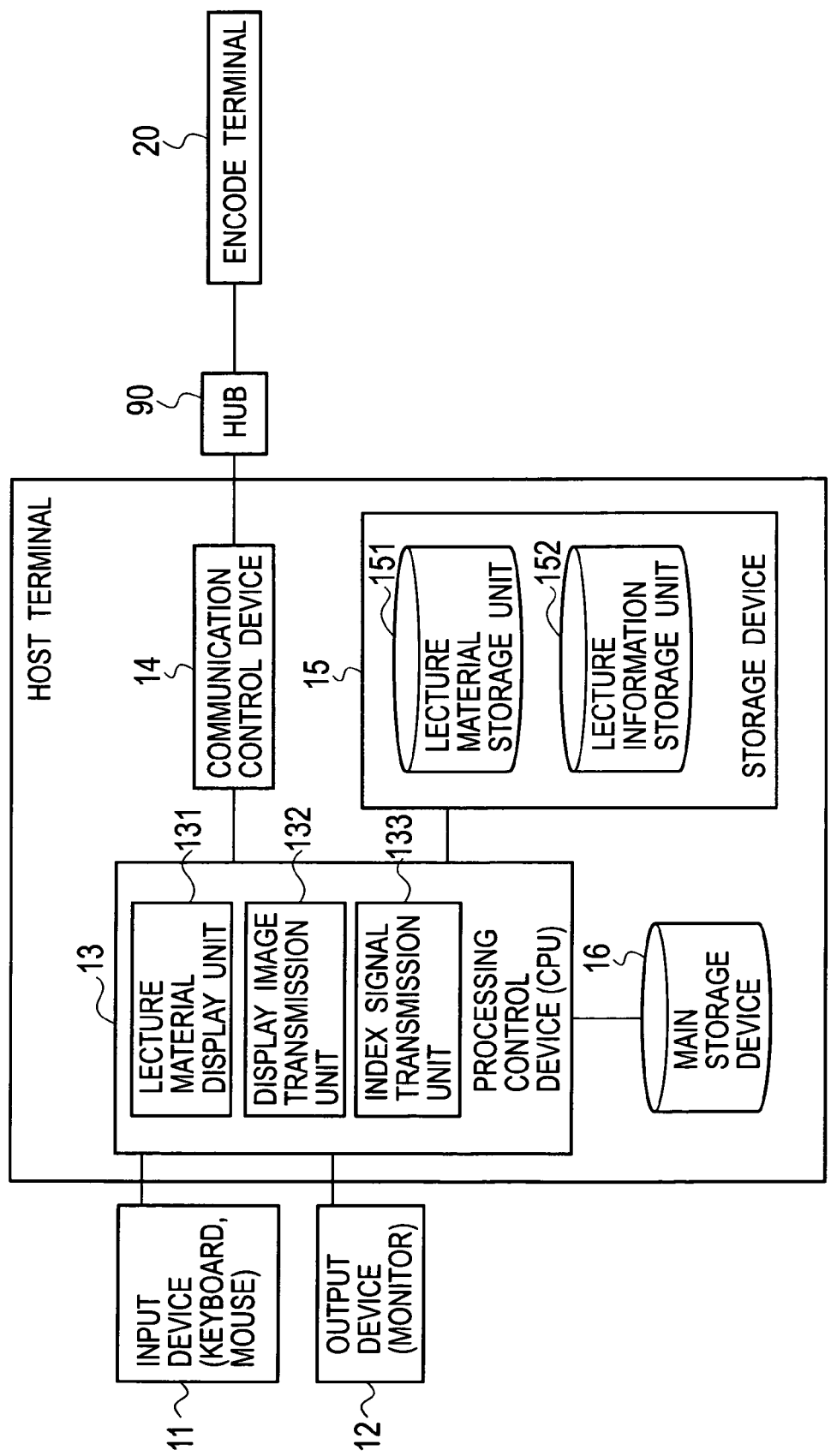
FIG. 2 is a schematic block diagram showing a hardware configuration example of a host terminal according to the embodiment of the present invention.

As shown in FIG. 2, the host terminal 10 at least includes an input device 11, the output device 12, a processing control device (CPU) 13, a communication control device 14, a storage device 15, a main storage device 16, and the like.

The host terminal 10 is a general computer. The input device 11 is a keyboard, a mouse or the like, and the output device 12 is a monitor or the like. The communication control device 15 is a device that serves as an interface for allowing the host terminal 10 to connect to the encode terminal 20 through the hub 90 and the communication network. The main storage device 16 is a storage device that stores commands, primary data and the like in processing of the processing control device 13.

A program for executing predetermined processing is installed in the host terminal 10, whereby a lecture material display unit 131, a display image transmission unit 132 and an index signal transmission unit 133 are implemented in the processing control device 13. The storage device 15 of the host terminal 10 includes a lecture material storage unit 151 and a lecture information storage unit 152.

Lecture material data created by the lecturer is stored in the lecture material storage unit 151 of the storage device 15. Attribute information and the like of the lecture performed by the lecturer are stored in the lecture information storage unit 152. Specifically, the attribute information is a name of the lecture, a name of the lecturer, a date of the lecture, a group name of the lectures in the case where there are a plurality of the lectures, and the like.

The lecture material display unit 131 reads out the lecture material data, which is stored in the lecture material storage unit 151, from the storage device 15, and displays the lecture material data on the output device (display device) 12 as the desk top of the host terminal 10. Here, the lecture material data is data of various applications, for example, such as a document and an image according to software in a predetermined presentation executed in the host terminal 10, an image displayed on the desk top of the host terminal 10, a home page displayed by an internet browser, and a picture browser. The lecture material data displayed on the output device 12 is projected on the screen 30 through the projector 40 connected to the host terminal 10.

The display image transmission unit 132 is means for transmitting the image, which is displayed on the output device 12 of the host terminal 10, to the encode terminal 20 through the hub 90. In such transmission of the image displayed on the output device 12, for example, virtual network computing (VNC) software is used. During recording of the lecture, the display image transmission unit 132 transmits the image of the desk top of the host terminal 10 to the encode terminal 20 whenever necessary. At this time, it is preferable that the display image transmission unit 132 adopt such a method of transmitting only data of a difference in order to reduce an amount of the data to be transmitted.

The index signal transmission unit 133 transmits an index signal to the encode terminal 20 in such a manner that an instruction is inputted thereto by the lecturer at a time that defines a break of the lecture during the lecture. It is preferable that this index signal be easy to input by being preset on a hot key or the like so that the lecture cannot be disturbed.
(Encode Terminal)

Next, a description will be made of a specific configuration of the encode terminal (content generation device) 20 with reference to FIG. 3. The encode terminal 20 generates content data regarding the lecture based on a lecture scene of the lecturer imaged by the lecturer imaging camera 60 and on display screen data acquired from the host terminal 10. The encode terminal 20 can create the content data in real time during the lecture of the lecturer. Moreover, the encode terminal 20 may generate content data further edited by adding an index to the content data generated therein, and so on.

Figure 3:
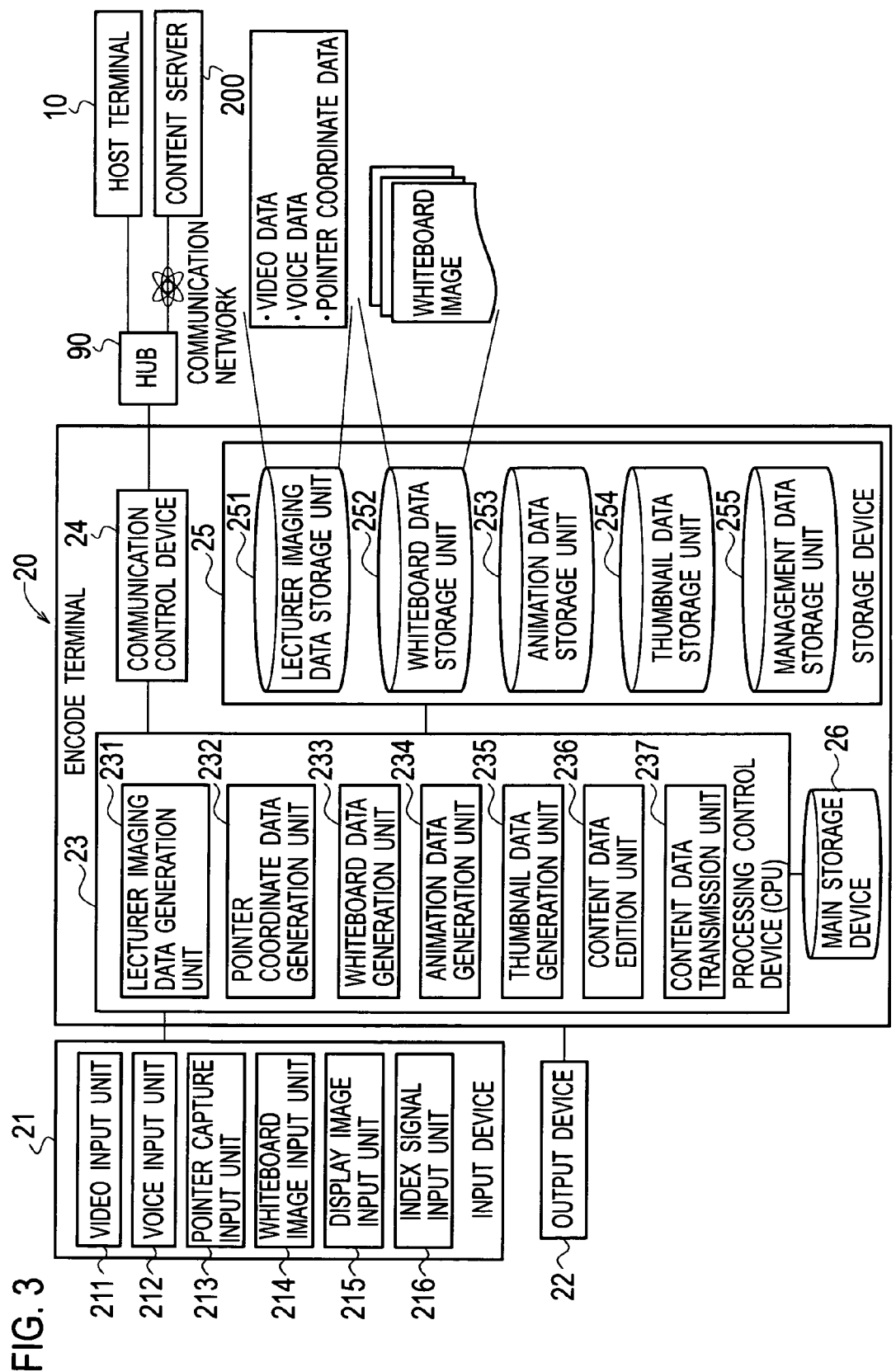
FIG. 3 is a schematic block diagram showing a hardware configuration example of an encoder terminal according to the embodiment of the present invention.

As shown in FIG. 3, the encode terminal 20 at least includes an input device 21, an output device 22, a processing control device (CPU) 23, a communication control device 24, a storage device 25, a main storage device 26, and the like.

The encode terminal 20 is a general computer. The input device 21 is a keyboard, a mouse or the like, and the output device 22 is a monitor or the like. The encode terminal 20 further includes a video input unit 211, a voice input unit 212, a pointer capture input unit 213, a whiteboard image input unit 214, a display image input unit 215 and an index signal input unit 216. The communication control device 25 is a device that serves as an interface for allowing the encode terminal 20 to connect to the host terminal 10 and the content server 200 through the hub 90 and the communication network. The main storage device 26 is a storage device that stores commands, primary data and the like in processing of the processing control device 23.

A program for executing predetermined processing is installed in the encode terminal 20, whereby a lecturer imaging data generation unit 231, a pointer coordinate data generation unit 232, a whiteboard data generation unit 233, an animation data generation unit 234, a thumbnail data generation unit 235, a content data edition unit 236 and content data transmission unit 237 are implemented in the processing control device 23. The storage device 25 of the encode terminal 20 includes a lecturer imaging data storage unit 251, a whiteboard data storage unit 252, an animation data storage unit 253, a thumbnail data storage unit 254 and management data storage unit 255.

The video input unit 211 acquires video data imaged by means of the lecturer imaging camera 60. Moreover, the voice input unit 212 acquires voice data acquired through a microphone connected to the lecturer imaging camera 60. The pointer capture input unit 213 acquires video data imaged by means of the pointer position detecting camera 50. The whiteboard image input unit 214 acquires coordinate data and color data of the characters and the like, which are written on the whiteboard 80. The display image input unit 215 acquires display image data from the host terminal 10. The index signal input unit 216 acquires the index signal inputted from the host terminal 10.

The lecturer imaging data generation unit 231 generates lecturer imaging data from the video data and the voice data, which are acquired through the video input unit 211 and the voice input unit 212. The lecturer imaging data generation unit 231 stores the generated lecturer imaging data in the lecturer imaging data storage unit 251 of the storage device 25. Here, the lecturer imaging data is moving picture data, for example, such as that of MPEG. It is preferable that the lecturer imaging data generation unit 231 acquire the video data and the voice data in real time during the lecture, and thereby generate the lecturer imaging data.

The pointer coordinate data generation unit 232 performs image processing for an image of the pointer, which is acquired through the pointer capture input unit 213, and calculates an indicated position by the pointer as coordinate data on the screen 30. Information on the indicated position by the pointer, which is thus calculated, is stored while being associated with time information of the lecturer imaging data 251 by the lecturer imaging data generation unit 231. For example, in the case where the lecturer imaging data 251 is the MPEG data, such position information of the pointer may be associated therewith as a script of the MPEG data.

The whiteboard data generation unit 233 acquires the coordinate data and color information of the characters, which are acquired through the whiteboard image input unit 214, for each fixed time (for example, several ten times per second), associates the coordinate data and the color information with time information of the lecture, and generates whiteboard data. The whiteboard data generation unit 233 stores the generated whiteboard data in the whiteboard data storage unit 252.

The animation data generation unit 234 animates the image displayed on the output device (display device) 12 of the host terminal, which is acquired through the display image input unit 215, and thereby generates animation data 253. The animation data generation unit 234 stores the generated animation data in the animation data storage unit 253 of the storage device 25. At this time, it is preferable that the animation data be generated in synchronization with the lecturer imaging data so as not to cause a timing shift from the lecturer imaging data and the whiteboard data at the time of being played back simultaneously therewith.

Upon receiving the index signal from the host terminal 10 through the index signal input unit 216, the thumbnail data generation unit 235 creates thumbnail data from an image of the lecturer imaging data given at that time, associates an identifier of the index signal and the thumbnail data with each other, and stores the identifier and the thumbnail data in the thumbnail data storage unit 254. At this time, the thumbnail data creation unit 235 creates an index as a break of the content data, and updates management data of the management data storage unit 255 by information of the index concerned.

The content data edition unit 236 edits the content data including the lecturer imaging data stored in the lecturer imaging data storage unit 251, the whiteboard data stored in the whiteboard data storage unit 252, the animation data stored in the animation data storage unit 253, the thumbnail data stored in the thumbnail data storage unit 254, such content management data stored in the management data storage unit 255, and the like. Specifically, in the case where the lecturer forgets to input the index signal, the content data edition unit 236 can perform processing such as creating the thumbnail data and giving a title to the content at predetermined timing.

As the management data of the management data storage unit 255, there is stored data necessary for the delivery and playback of the content in each processing performed by the lecturer imaging data generation unit 231, the pointer coordinate data generation unit 232, the whiteboard data generation unit 233, the animation data generation unit 234 and the thumbnail data generation unit 235.

The content data transmission unit 236 transmits the content data to the content server 200. The content data includes the lecturer imaging data stored in the lecturer imaging data storage unit 251, the whiteboard data stored in the whiteboard data storage unit 252, the animation data stored in the animation data storage unit 253, the thumbnail data stored in the thumbnail data storage unit 254, the content management data stored in the management data storage unit 255, and the like. By the content data transmission unit 237, the content data may be transmitted to the content server 200 while the lecturer is giving the lecture, or may be transmitted after the edition of the content, which is performed by the content data edition unit 236, is completed.

(Content Server)

Figure 4:
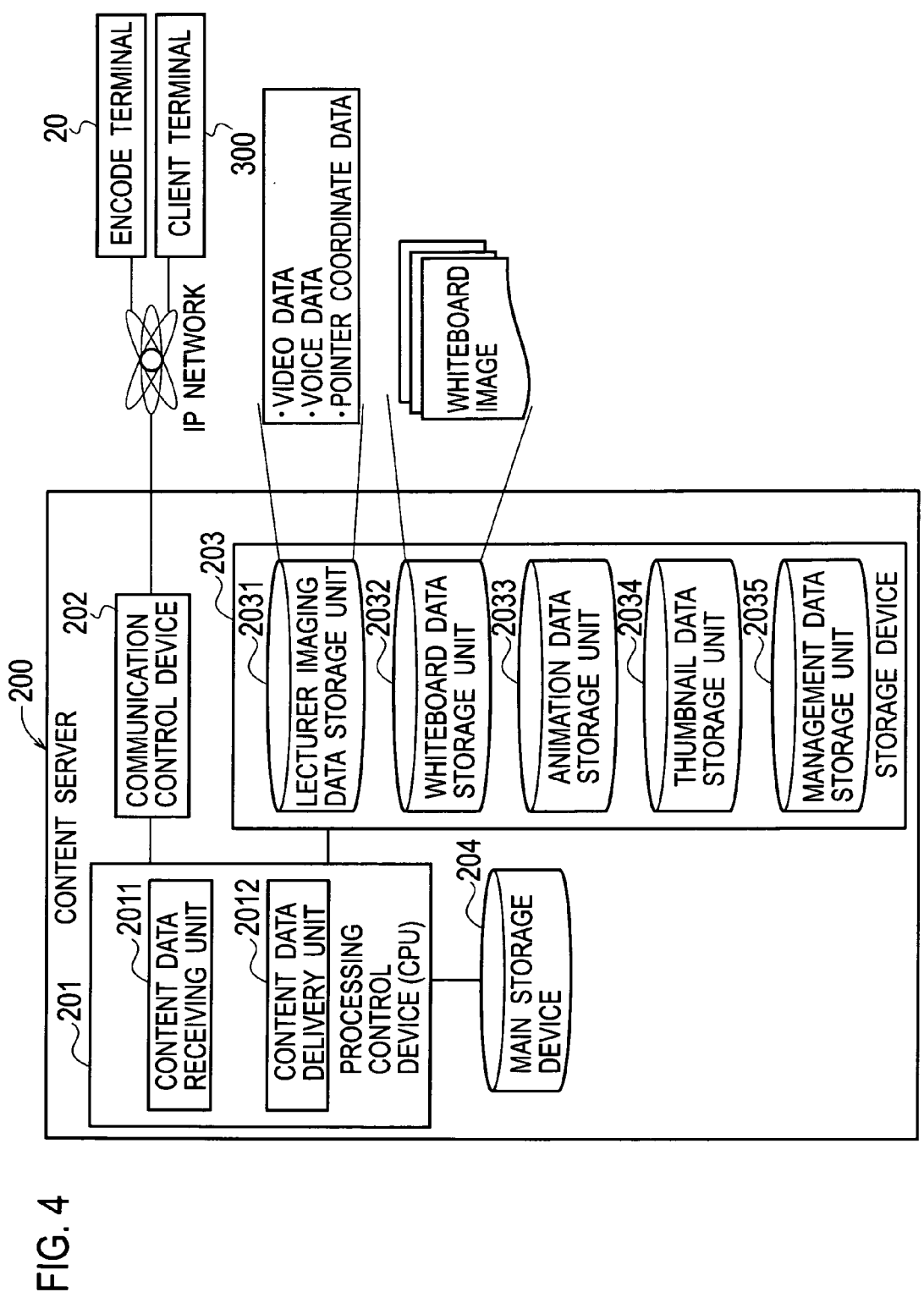
FIG. 4 is a schematic block diagram showing a hardware configuration example of a content server according to the embodiment of the present invention.

Next, a description will be made of a specific configuration of the content server 200 with reference to FIG. 4. This content server 200 at least includes a processing control device (CPU) 201, a communication control device 202, a storage device 203, a main storage device 204 and the like.

The content server 200 is a general computer. The communication control device 202 is a device that serves as an interface for allowing the content server 200 to connect to the encode terminal 20 and the client terminals 300 through the communication networks. The main storage device 204 is a storage device that stores commands, primary data and the like in processing of the processing control device 201.

A program for executing predetermined processing is installed in the content server 200, whereby a content data receiving unit 2011 and a content data delivery unit 2012 are implemented in the processing control device 201. The storage device 203 of the content server 200 includes a lecturer imaging data storage unit 2031, a whiteboard data storage unit 2032, an animation data storage unit 2033, a thumbnail data storage unit 2034 and a management data storage unit 2035.

The content data receiving unit 2011 is means for receiving the content data transmitted from the encode terminal 20 and storing the content data in the storage device 203. Specifically, the data which the content data receiving unit 2011 stores in the storage device 203 is the lecturer imaging data stored in the lecturer imaging data storage unit 2031, the whiteboard data stored in the whiteboard data storage unit 2032, the animation data stored in the animation data storage unit 2033, the thumbnail data stored in the thumbnail data storage unit 2034, the management data stored in the management data storage unit 2035, and the like.

The content data delivery unit 2012 reads out the content data from the storage device 203, and delivers the content data in real time during the lecture or in accordance with the requests from the client terminals 300. Specifically, the data which the content data delivery unit 2012 delivers to the client terminals 300 is each data stored in the lecturer imaging data storage unit 2031, the whiteboard data storage unit 2032, the animation data storage unit 2033, the thumbnail data storage unit 2034 and the management data storage unit 2035.

(Client Terminals 300)

Figure 5:
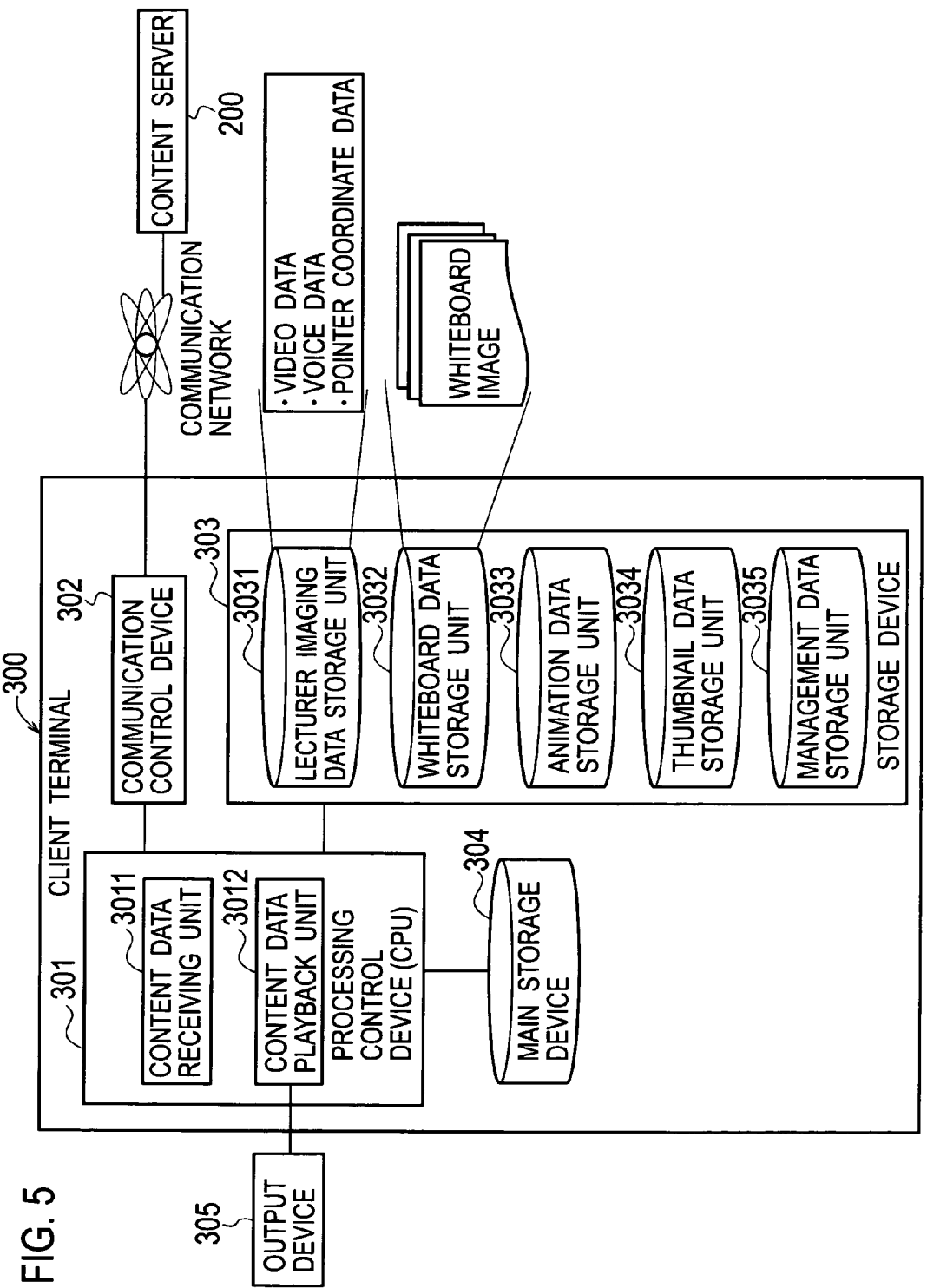
FIG. 5 is a schematic block diagram showing a hardware configuration example of a client terminal according to the embodiment of the present invention.

Next, a description will be made of a specific configuration of each of the client terminals 300 with reference to FIG. 5. This client terminal 300 at least includes a processing control device (CPU) 301, a communication control device 302, a storage device 303, a main storage device 304, an output device 305 and the like.

The client terminal 300 is a general computer. The communication control device 302 is a device that serves as an interface for allowing the client terminal 300 to connect to content server 200 through the communication network. The main storage device 304 is a storage device that stores commands, primary data and the like in processing of the processing control device 301. The output device 305 is a monitor, a speaker and the like, and is a device that outputs a processing result of the processing control device 301.

Software called a browser is installed in the client terminal 300. By this browser, a content data receiving unit 3011 and a content data playback unit 3012 are implemented in the processing control device 301. The storage device 303 of the client terminal 300 includes a lecturer imaging data storage unit 3031, a whiteboard data storage unit 3032, an animation data storage unit 3033, a thumbnail data storage unit 3034 and management data 3035.

The content data receiving unit 3011 receives the content data transmitted from the content server 200, and stores the received content data in the storage device 303. Specifically, the data which the content data receiving unit 3011 stores in the storage device 303 is lecturer imaging data stored in the lecturer imaging data storage unit 3031, whiteboard data stored in the whiteboard data storage unit 3032, animation data stored in the animation data storage unit 3033, thumbnail data stored in the thumbnail data storage unit 3034, and management data stored in the management data storage unit 3035. Each data stored in the storage device 303 is data corresponding to each data stored in the storage device 203 of the content server 200.

The content data playback unit 3012 plays back each data stored in the storage device 303 of the client terminal 300, and outputs each data to the output device 305. At this time, the lecturer imaging data, the whiteboard data and the animation data are played back in synchronization with one another in accordance with a progress of the lecture.

(Content Delivery Method)

Figure 6:
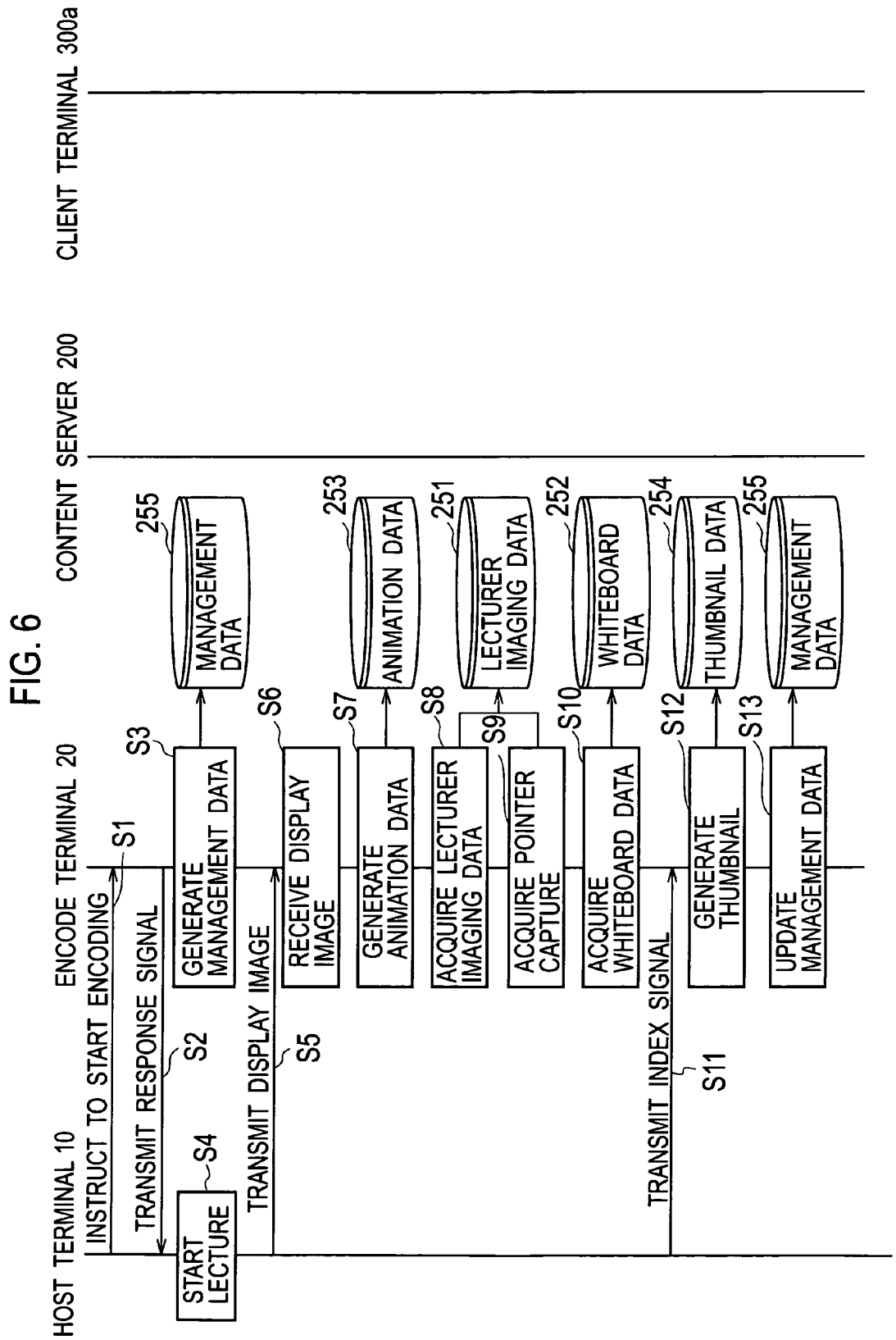
FIG. 6 is a sequence chart (No. 1) for explaining operations of the content generation system according to the embodiment of the present invention.
Figure 7:
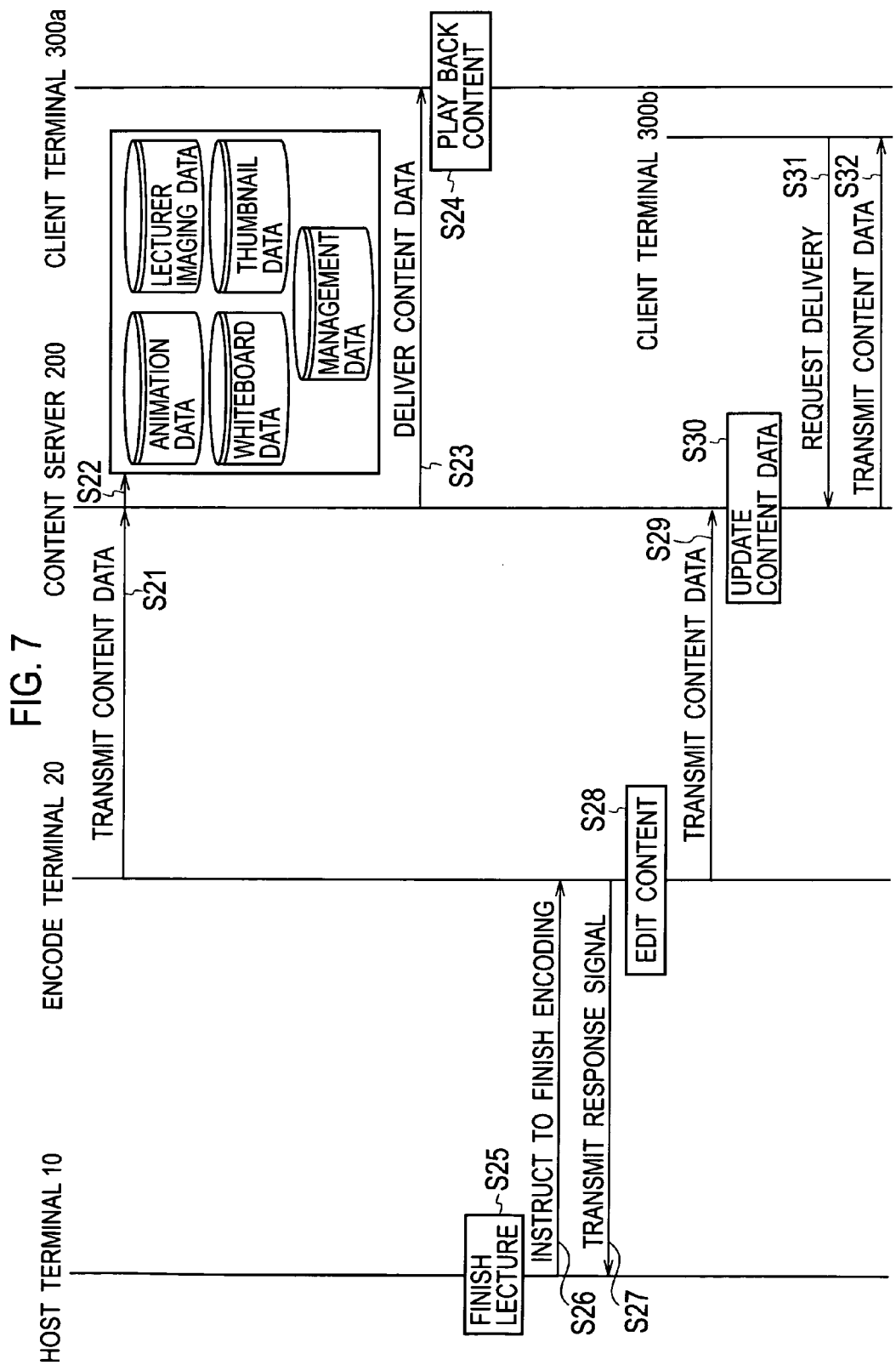
FIG. 7 is a sequence chart (No. 2) for explaining the operations of the content generation system according to the embodiment of the present invention.

Next, a description will be made of operations of the content generation system 1 of the present invention with reference to FIGS. 6 and 7. In advance, the variety of instruments is connected to one another, and power supplies of the variety of instruments are turned on.

In Step S1, the host terminal 10 transmits an instruction to start encoding to the encode terminal 20. Upon receiving the instruction to start the encoding, the encode terminal 20 checks states of the variety of instruments connected to the encode terminal 20 concerned. If the encode terminal 20 is capable of doing the encoding, then in Step S2, the encode terminal transmits a response signal to the host terminal 10. At this time, the encode terminal 20 starts to receive the data from the variety of devices, and generates the management data and stores the management data in the management data storage unit 255. At the time of transmitting the response signal, the encode terminal 20 simultaneously starts processing of Step S6 to processing of Step S10, which will be described later.

In the case of confirming that the response signal has been transmitted from the encode terminal 20, the lecturer starts the lecture in Step S4.

Though all of Step S5 to Step S13 are processed simultaneously, a description will be made below of each of the steps independently of the others for the sake of explanation.

When the lecture is started, then in Step S5, the display image of the host terminal 10 is transmitted to the encode terminal 20 whenever necessary by the display image transmission unit 132 of the host terminal 10. In Step S6, the display image data is inputted to the encode terminal 20 by the display image input unit 215 thereof. Moreover, in Step S7, the animation data is generated from the display image data, which is received in Step S6, by the animation data generation unit 234. The generated animation data is stored in the animation data storage unit 253 of the storage device 25.

Meanwhile, in Step S8, imaging data of the lecture scene given by the lecturer is acquired by the video input unit 211 and voice input unit 212 of the encode terminal 20, and in Step S9, a pointer capture is acquired. Then, the lecturer imaging data is generated by the lecturer imaging data generation unit 231 and the pointer coordinate data generation unit 232. The generated lecturer imaging data is stored in the lecturer imaging data storage unit 251.

Meanwhile, in Step S10, the data of the characters and the like, which are written on the whiteboard 80, is acquired by the whiteboard image input 214 of the encode terminal 20. Then, the whiteboard data is generated by the whiteboard data generation unit 233. The generated whiteboard data is stored in the whiteboard data storage unit 252.

In Step S11, the index signal is transmitted by the lecturer during the lecture. Then, in Step S12, the thumbnail is created by the thumbnail data generation unit 235 of the encode terminal 20. The created thumbnail is stored in the thumbnail data storage unit 254. Moreover, in Step S13, the management data in which the timing when the index signal was transmitted and the generated thumbnail are associated with each other is generated, and in Step S13, the management data storage unit 255 is updated. In such a way, a plurality of the indices is given during the lecture, whereby the students can be facilitated to take the lecture regarding an arbitrary theme.

As described above, during the lecture, the processing of Step S5 to the processing of Step S13 are executed simultaneously whenever necessary, whereby the content data is generated in the encode terminal 20.

Moreover, simultaneously with the processing of Step S5 to the processing of Step S13, the content data generated by the processing of Step S5 to the processing of Step S13 is transmitted to the content server 200 by the encode terminal 20 in Step S21. Upon receiving the content data, the content data receiving unit 2011 of the content server 200 stores the content data, which is received in Step S22, in the storage device 203. In the case where the content data is delivered in real time, the processing of Step S21 and the processing of Step S22 are executed simultaneously with the processing of Step S5 to the processing of Step S13. Meanwhile, in the case where the content data is not delivered in real time, the processing of Step S21 and the processing of Step S22 are executed at arbitrary timing.

Moreover, in Step s23, the content data stored in the storage device 203 is transmitted to the client terminal 300a by the content data delivery unit 2012 of the content server 200. At this time, in the case where the content is delivered in real time, the delivery processing of the content data in Step S23 is executed simultaneously with the processing of Step S5 to the processing of Step S13 and the processing of Step S21 and the processing of Step S22.

The client terminal 300a receives the content data by the client data receiving unit 3011, and in Step S24, plays back the content data by the content data playback unit 3012, and outputs the content data to the output device 305. The student who operates the client terminal 300a browses, views, listens to and learns the content outputted from the output device 305.

The processing of Step S5 to the processing of Step S24 are executed whenever necessary during the lecture in the case where the content data is delivered in real time.

When the lecture finishes in Step S25, an instruction to finish the encoding is transmitted to the encode terminal 20 from the host terminal 10 in Step S26. Upon receiving the instruction to finish the encoding, the encoder 20 finishes receiving the data from the variety of devices connected to the encoder terminal 20, and in Step S27, transmits a response signal to the host terminal 10.

The creation processing of the content during the lecture finishes by the above-described series of processing; however, for the purpose of creating a content with higher quality, the content data may be edited by the content data edition unit 236 in the encoder terminal 20 in Step S28. Specifically, a variety of settings such as an insertion of an index to the content data, a change of a layout arrangement at the playback time of the content data, and a change of a play list at the playback time of the content can be changed. When the content data is edited, such edition of the content data is reflected on the management data of the management data storage unit 255 by the content data edition unit 236. In Step S29, the content data is transmitted to the content server 200 by the content data transmission unit 237. Then, in Step S30, the content data is received by the content receiving unit 2011 of the content server 200, and the content data of the storage device 203 is updated.

The content data registered in the content server 200 as described above can be delivered at arbitrary timing by transmitting the request thereof from the client terminal 300 to the content server 200.

Specifically, when the delivery request of the content is transmitted from the client terminal 300b in Step S31, the content delivery unit 2012 of the content server 200 acquires the requested content data from the storage device 203. Moreover, in Step S32, the content delivery unit 2012 transmits the acquired content data to the client terminal 300b. In the client terminal 300b, at convenient time of the student, the student can play back and learn the acquired content data.

(Content Data)

Figure 8:
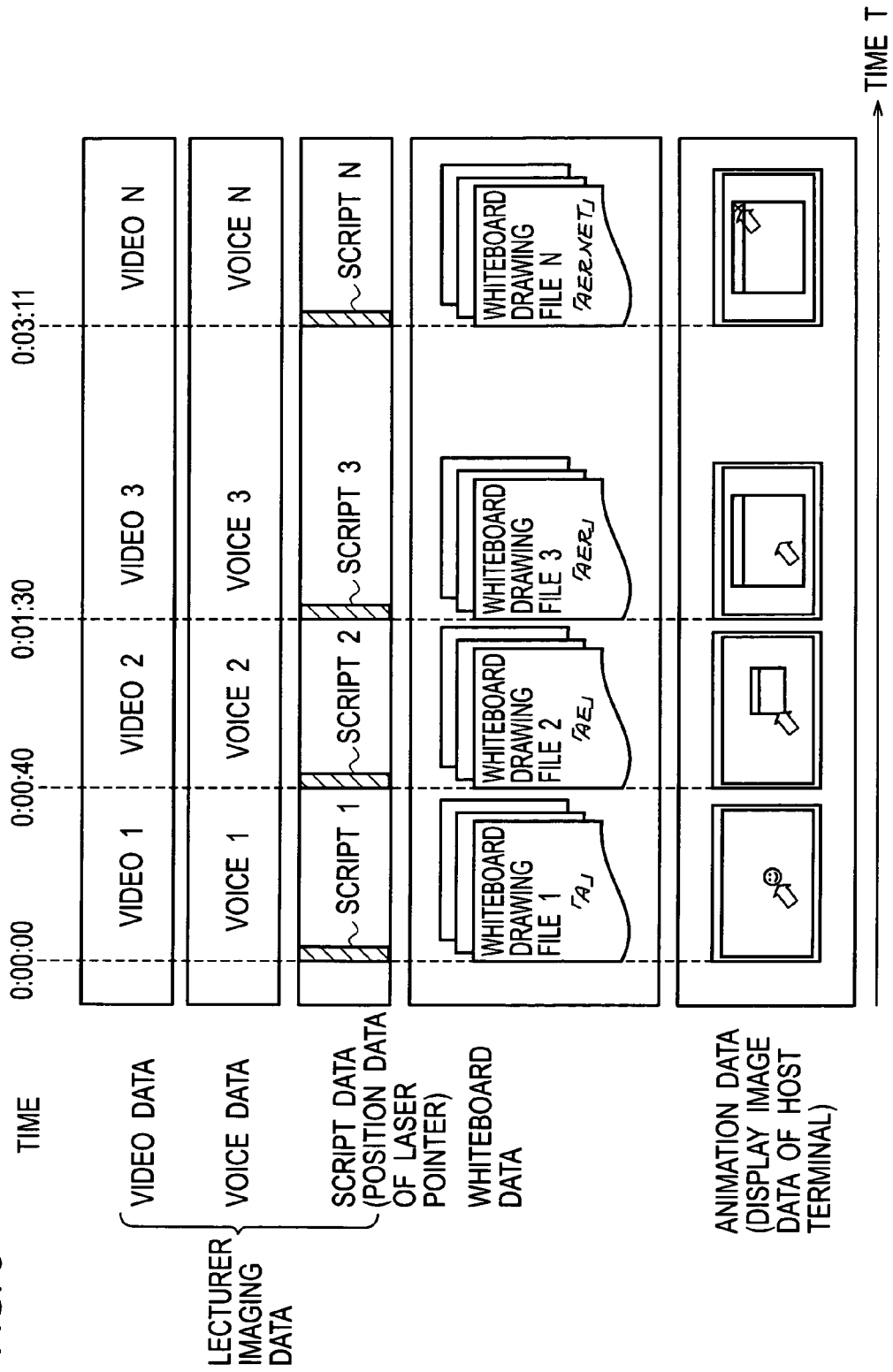
FIG. 8 is a diagram for explaining content data of the content generation system according to the embodiment of the present invention.

Next, a description will be made of the content data in the best mode of the present invention with reference to FIG. 8. The content data includes the lecturer imaging data, the whiteboard data and the animation data. The content data may include other data in response to a form of the lecture and the number of cameras.

The lecturer imaging data includes the video data, the voice data and the script data. The video data and the voice data are data of an image and voice of the lecturer imaged by the lecturer imaging camera 60. The script data is data that follows the lecturer imaging data, and in this embodiment, is data that shows a position on the screen 30, which the lecturer indicates by the laser pointer 70. These video data, voice data and script data are synchronized with one another in accordance with a timeline of the lecture.

The whiteboard data is data of the characters and the like, which are written on the whiteboard 80. The whiteboard data is also synchronized with the lecturer imaging data in accordance with the timeline of the lecture.

The animation data is data that is based on the display image displayed on the output device 12 of the host terminal 10. The animation data is also synchronized with the lecturer imaging data in accordance with the timeline of the lecture.

Figure 9:
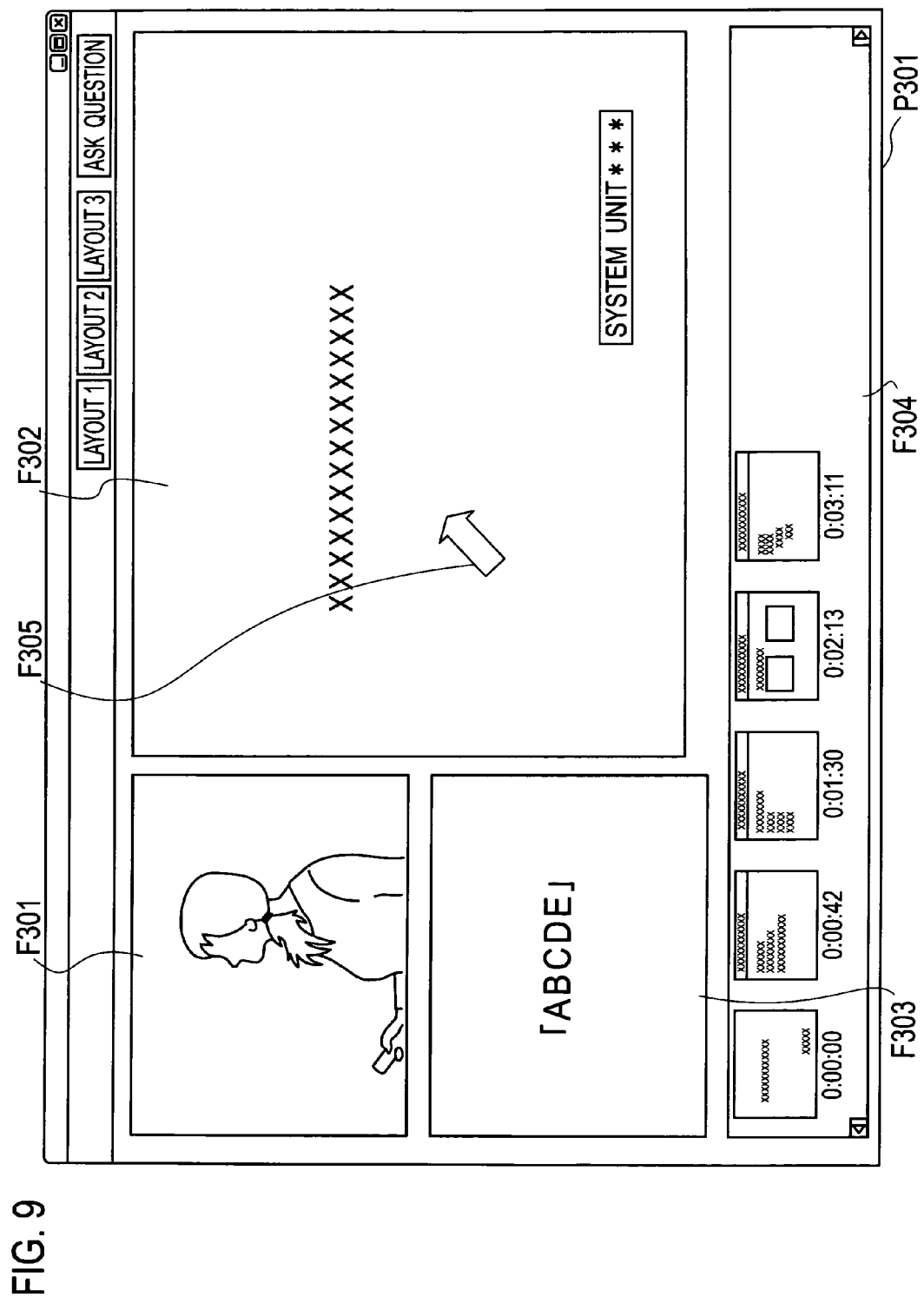
FIG. 9 is a diagram showing an example of a screen displayed on the client terminal according to the embodiment of the present invention at a time when the content data is played back thereon.

The content data is displayed, for example, by a content display screen P301, which is as shown in FIG. 9, on the client terminal 300.

The content display screen P301 includes a video frame F301, a display image frame F302, a whiteboard frame F303, a thumbnail frame F304 and a laser pointer F305.

The video frame F301 is a frame on which the video data among the lecturer imaging data of the lecturer imaging data storage unit 3031 is to be played back. Note that the voice data among the lecturer imaging data is converted into a voice signal and outputted by the speaker.

The display image frame F302 is a frame on which the animation data of the animation data storage unit 3033 is to be played back. On the display image frame F302, the image displayed on the desk top of the host terminal 10, which is also the image projected on the screen 30, is played back as the animation data. Here, on the display image frame F302, the position of the laser pointer, which is stored as the pointer coordinate data in the lecturer imaging data, is reproduced as the laser pointer F305. In such a way, the image projected on the projector during the lecture and the position of the laser pointer, which the lecturer indicates, can be reproduced on the client terminal 300.

The whiteboard frame F303 is a frame on which the whiteboard data of the whiteboard data storage unit 3032 is to be played back.

On the thumbnail frame F304, thumbnail images stored in the thumbnail data storage unit 3034 are displayed. Any of the thumbnails of the thumbnail frame F305 is selected, whereby the content data is played back from a time associated with the thumbnail concerned.

On this content display screen P301, a layout thereof is changed, whereby positions and sizes of the respective frames can be changed as appropriate.

(Content Edition)

Next, a description will be made of a screen on which the content data edition unit 236 is to edit the content data in the encode terminal 20 in the best mode of the present invention with reference to FIG. 10 and FIG. 11.

Figure 10:
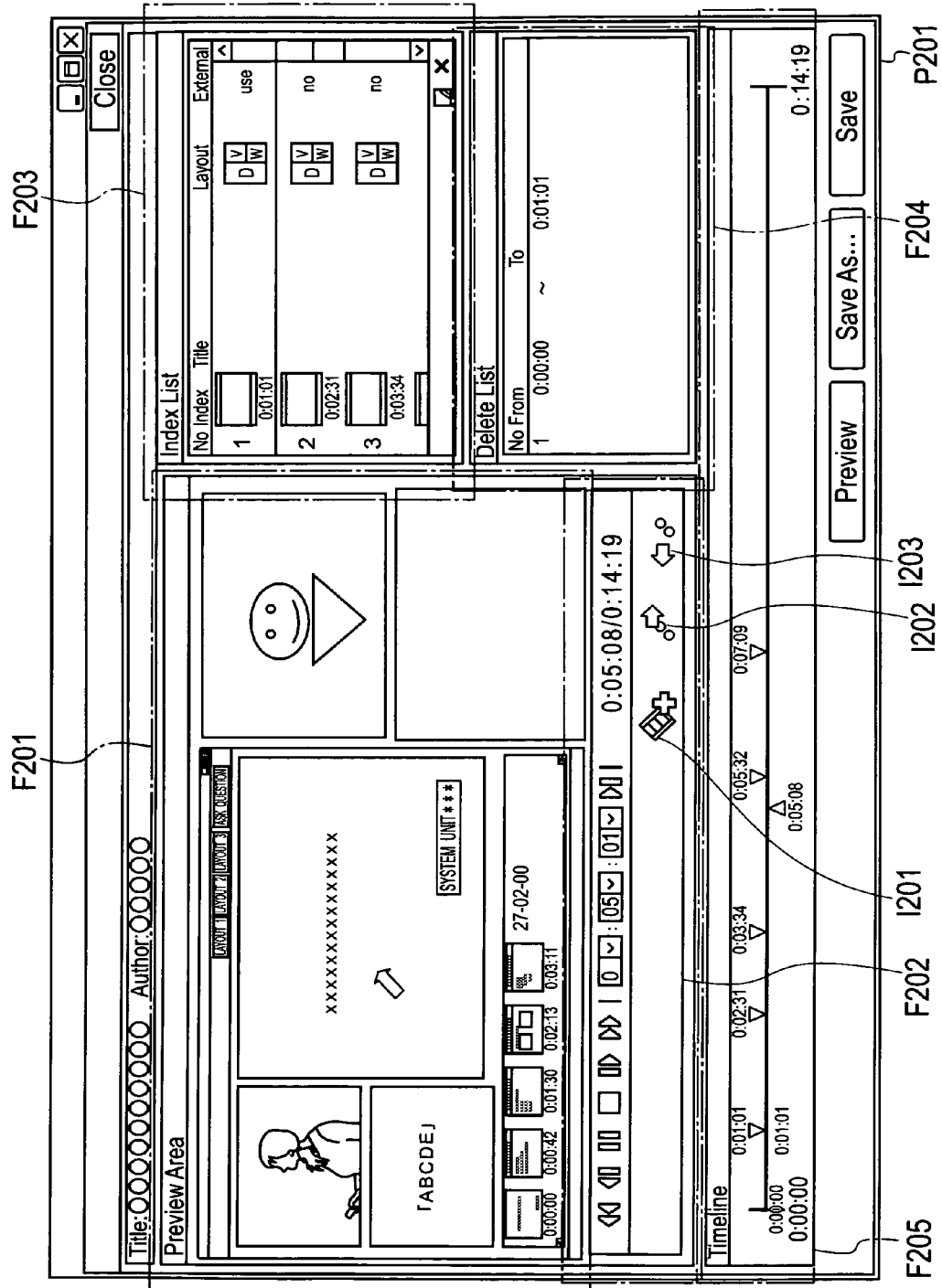
FIG. 10 is a diagram showing an example of a screen displayed on an encode terminal according to the embodiment of the present invention at a time when the content is edited thereon.

FIG. 10 is an edition screen P201 for the content. The edition screen P201 includes a preview display portion F201, an edition control portion F202, an index list display portion F203, a deletion list display portion F204, and a timeline display portion F205.

The preview display portion F201 is a preview screen that shows how the content data is to be actually displayed on the client terminal 300.

The edition control portion F202 is an interface to which instructions for the playback, stop, fast forward, rewind and the like are to be inputted in order to display a preview on the preview display portion F201. Moreover, the edition control portion F202 includes an index adding icon 1201, a deletion starting icon 1202 and a deletion finishing icon 1203.

With regard to the index adding icon 1201, when the index adding icon 1201 is clicked at predetermined timing, the thumbnail data is generated by the thumbnail data generation unit 235 at the timing concerned, and the break of the content is generated. Each index generated herein is displayed on the index list display portion F203.

Figure 11:
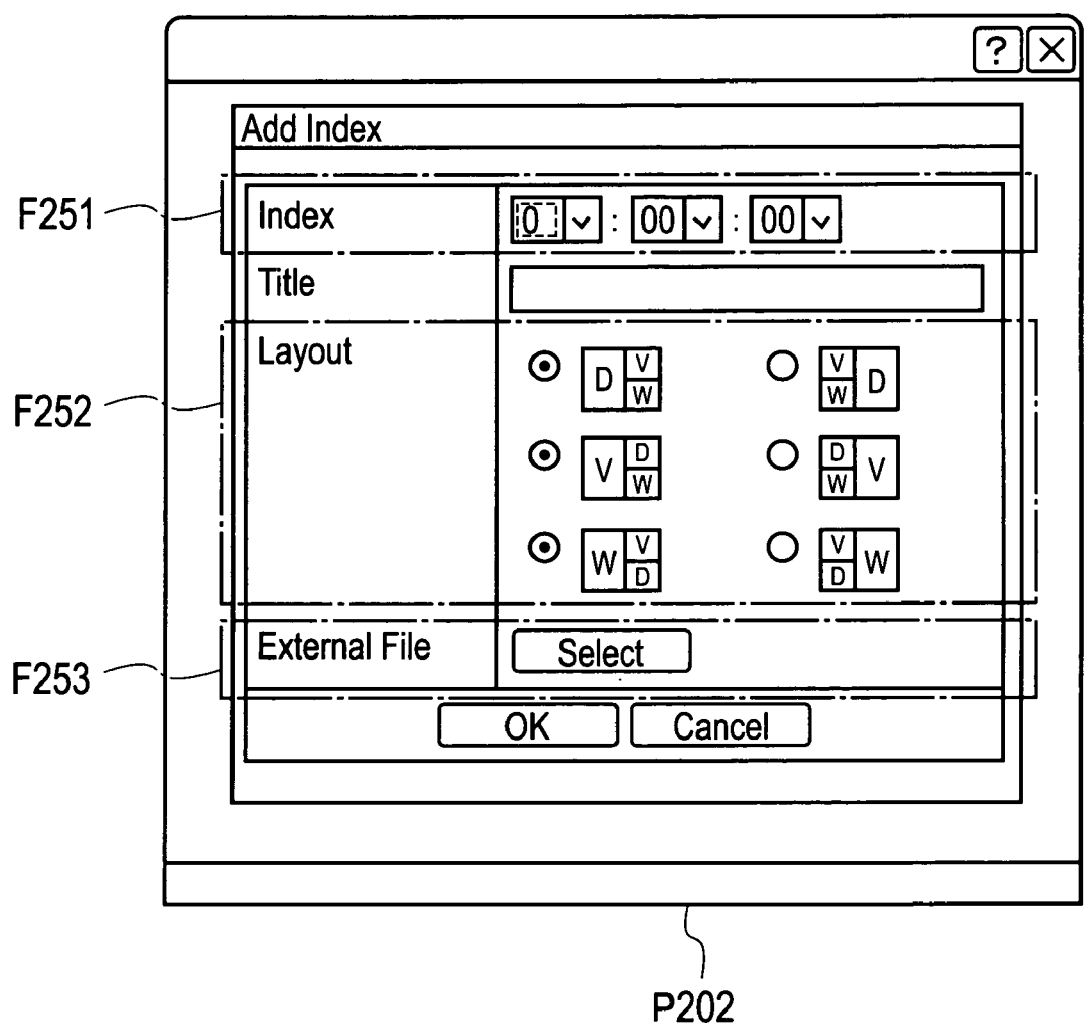
FIG. 11 is a diagram showing an example of a screen displayed on the encode terminal according to the embodiment of the present invention at a time when an index is added to the content during editing the content on the encode terminal.

At this time, an index adding screen P202 as shown in FIG. 11 is displayed. Here, the index adding screen P202 includes a time designation portion F251 for designating a time of adding the index, a layout designation portion F252 for designating a display layout of a content on and after the index concerned, an external file designation portion F253 for designating image data to be displayed at a time of playing back the content on and after the index concerned, and the like.

Meanwhile, the deletion starting icon 1202 and the deletion finishing icon 1202 are icons for deleting an unnecessary portion such as a silent portion in the playback of the content data. When the deletion of the content data is instructed by the respective icons, the deleted portion is displayed on the deletion list display portion F204. The portion displayed on the deletion list display portion F204 is removed from the play list of the content, and the content is played back while skipping the deleted portion at the when the content is played back. The content is played back by using the play list, whereby the content to be played back can be changed arbitrarily without changing the data acquired from each device.

On the timeline display portion F205, there is displayed time information on the entire lecture, which accords to the timeline during the lecture. The time information includes a time position where the content is being played back on the preview display portion F201 at present, and a time position of the set index, a time position where the unnecessary portion is deleted, and the like.

(Pointer Coordinate Data Generation Unit)

Here, a description will be made of processing for generating the point coordinate data by the pointer coordinate data generation unit 232 of the encode terminal (content generation device) 20. The pointer coordinate data generation unit 232 performs the image processing for the image of the pointer, which is acquired through the pointer capture input unit 213, and calculates the indicated position by the pointer as the coordinate data on the screen 30.

In the best mode of the present invention, the pointer position detecting camera 50 images the screen 30 irradiated by the laser pointer 70, performs the image processing therefor, and thereby acquires a position of the screen 30, which is irradiated by the laser pointer 70.

Specifically, when the pointer position detecting camera 50 is placed before the lecture is started, the pointer position detecting camera 50 images the screen 30 from such a placed position thereof. FIG. 12A is an example of screen reference data 261 imaged as described above. Such screen reference data 261 includes a screen 30a, and the screen 30a includes a projection area 30b to be projected by the projector 40. Data to be projected by the projector 40 is the display image data displayed on the display device 12 of the host terminal 10, and the like. Since the projection area is an area to be displayed by the projector 40, the projection area is rectangular in general. However, depending on a distance and an angle between the projector 40 and the screen 30, the placed position of the pointer position detecting camera 50, and the like, the projection area 30b becomes quadrangle with non-right angle corners in some case as shown in FIG. 12A. Even in such a case where the projection area 30b warps, it is necessary for the pointer coordinate data generation unit 232 to accurately grasp a position of a pointer position 71.

The pointer coordinate data generation unit 232 acquires information on an outline of the projection area 30b in the screen reference data 261 imaged before the lecture is started. For example, by means of the input device, the operator designates the corners of such a quadrangle of the projection area on the screen reference data 261, whereby the point coordinate data generation unit 232 can acquire the information on the outline of the projection area 30b.

Moreover, when the pointer coordinate data generation unit 232 acquires the outline of the projection area 30b, the pointer coordinate data generation unit 232 performs coordinate conversion for the projection area 30b into a rectangle in correction data 262 shown in FIG. 12B. The correction data 262 shown in FIG. 12B corresponds to a size or resolution of an area used at the time of displaying the animation data on the client terminal 300a or the like. For example, in the case where the area on which the animation data is to be displayed has 800×600 pixels, the correction data 262 also has 800×600 pixels.

When the pointer coordinate data generation unit 232 acquires the image data from the pointer position detecting camera 50, the pointer coordinate data generation unit 232 retrieves the respective pixel values in the image data, and acquires a position of the infrared light. In the case where the position of the infrared light looks white in the image data, the pointer coordinate data generation unit 232 acquires a coordinate, in which values of RGB are high for each pixel in the image data, as the position of the infrared light. Moreover, by using the correction data 262, the pointer coordinate data generation unit 232 converts the acquired position of the infrared light into a position on the correction data 262, and acquires a coordinate of a pointer position. Specifically, the pointer coordinate data generation unit 232 determines a pointer position 71a on the correction data 262 so that a relative position of the pointer position 71 on the projection area 30b and a relative position of the pointer position 71a can be the same in FIG. 12A.

As described above, before the lecture is started, the screen reference data 261 is acquired, and the correction data 262 is generated, whereby an appropriate pointer position can be detected regardless of placed positions of the projector 40, the screen 30 and the pointer position detecting camera 50 and the like.

(Synchronization at Time of Generating Content Data)

Next, a description will be made of synchronization processing at the time of generating the content data, and in particular, synchronization processing between the animation data and the instruction imaging data.

The encode terminal (content generation device) 20 synchronizes the lecturer imaging data acquired by means of the lecturer imaging camera 60 and the display screen data acquired from the host terminal 10 with each other, and generates the content data. The lecturer imaging data and the display image data are acquired from the different devices by the different pieces of processing. Accordingly, even if these data are data regarding one lecture, it is apprehended that a time shift may occur in response to processing capabilities of the respective devices. Moreover, in the animation data generation unit 234, it is apprehended that frame data may drop out owing to various circumstances such as a processing load at the time of generating the frame data from the display image data.

In this case, in the case of playing back content data of a lecture, of which time is as long as two hours or the like, on the client terminal 300a and the like, even if the lecturer imaging data and the animation data are played back simultaneously, it is apprehended that the time shift therebetween may be increased, resulting in that the content data becomes extremely difficult to view. In this connection, in the best mode of this application, the animation data is adjusted so as to reduce the time shift.

The animation data to be generated by the animation data generation unit 234 includes a plurality of the frame data generated from the display image data sequentially transmitted from the host terminal 10. Every time of acquiring the display image data at predetermined timing, the animation data generation unit 234 converts the display image data into the piece of the frame data, and combines such pieces of the frame data with one another, thereby generates the animation data. Here, it is preferable that the animation data generation unit 234 create the animation data while dividing the animation data into files of a predetermined data size. In such a way, an overhead time in such an operation as the playback and the stop can be reduced. Moreover, only necessary files can be edited and transmitted in such a manner that the size of one file is reduced.

The animation data generation unit 234 calculates the playback time from the number of converted frame data and a frame rate at predetermined timing, and adds or deletes the frame data so that the playback time concerned can coincide with a playback time of the lecturer imaging data, thereby generates the animation data.

Here, a description will be made of the case where the frame rate is 10 fps (frames per second). Every 0.1 second, the animation data generation unit 234 acquires the display image data from the host terminal 10, and generates the frame data. For example, every 10 seconds, the animation data generation unit 234 inquires the playback time of the lecturer imaging data, and adds or deletes the frame data to or from the animation data so that the playback time of the animation in the animation data generation unit 234 can become the same as the playback time of the lecturer imaging data.

For example, in the case where the frame rate is 10 fps, one thousand pieces of the frame data must have been generated when 10 seconds elapsed. However, in some case, only 995 pieces of the frame data are created since the dropout of the frame data occurs. The dropout of the frame data occurs owing to the fact that the frame data to be generated is not generated because of a processing delay in the animation data generation unit 234, that a communication failure with the host terminal 10 occurs, and so on. In this case, five pieces of frame data, which are equivalent to such a shortfall, are inserted into the animation data, whereby the animation data can be synchronized with the lecturer imaging data.

Figure 13:
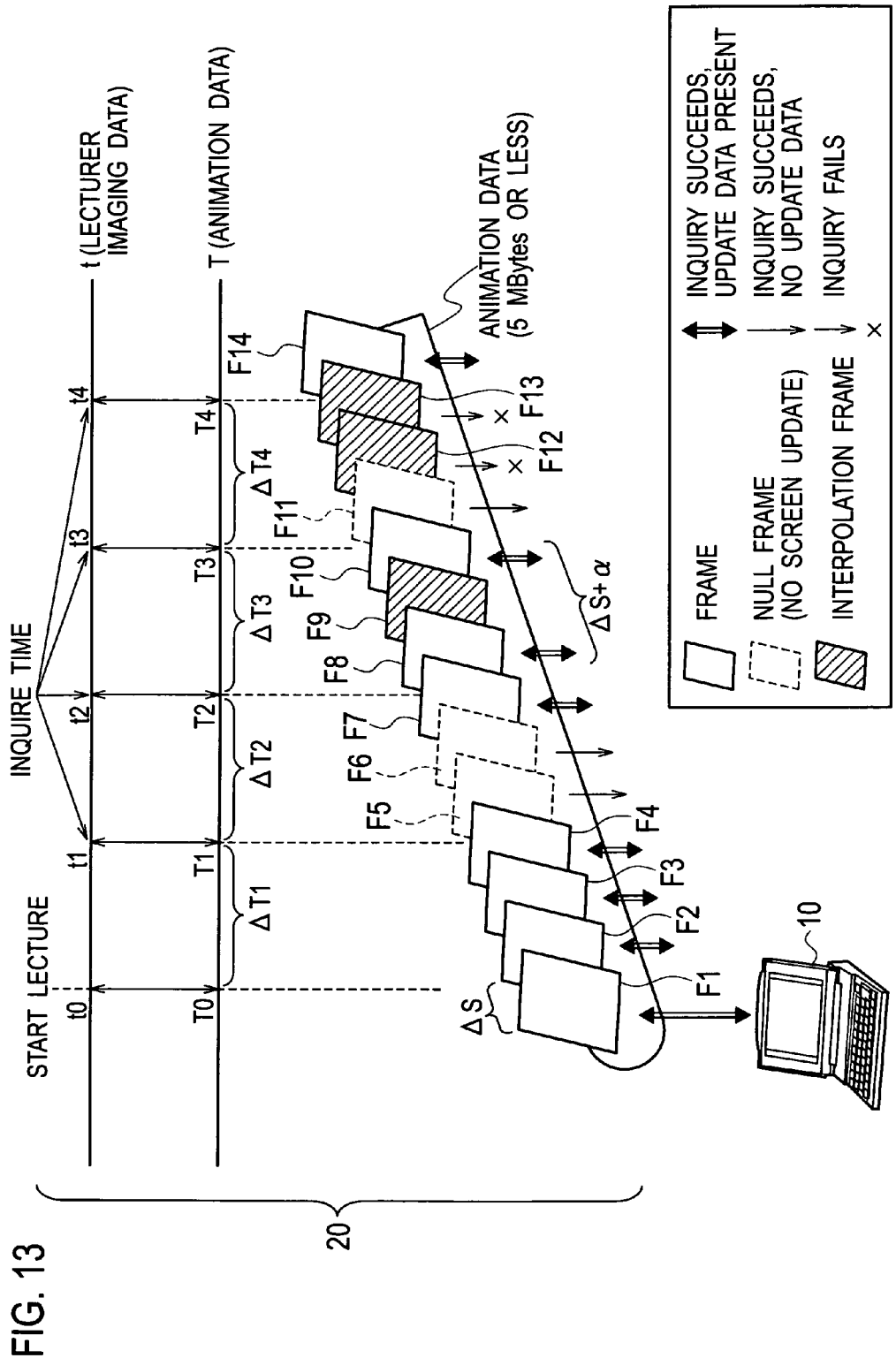
FIG. 13 is a diagram explaining processing of an animation data generation unit according to the best embodiment of the present invention.

A description of the above will be made with reference to FIG. 13. As shown in FIG. 13, while the lecturer imaging data is played back in accordance with a time axis t, the animation data is played back in accordance with a time axis T. Since the lecturer imaging data and the animation data start simultaneously at the time when the lecture is started, a relationship of t0=T0 is established.

Accordingly, every Δs, the animation data generation unit 234 receives the display image data from the host terminal 10, and generates frame data F. Then, the animation data generation unit 234 compares a playback time T1 of the animation data and a playback time t1 of the lecturer imaging data 251 with each other at timing when a predetermined time has elapsed. Here, the playback time of the animation data is acquired by multiplying the number of generated pieces of the frame data and the frame rate by each other. In the case where a relationship of T1=t1 is established, the frame data is not increased or reduced.

However, as shown in FIG. 13, the animation data generation unit 234 sometimes creates frame data F10 without creating frame data F9 in such a case where it takes a time to create frame data F8. In this case, though three pieces of frame data originally must have been created during a period from T2 to T3, only two pieces of the frame data are created since the frame-data F9 was not created. A playback time of the animation data, which is calculated from the number of created frame data, is decreased by an amount of the data of one frame in comparison with the playback time of the lecturer imaging data 251.

Accordingly, the animation data generation unit 234 interpolates the frame data F9, and adjusts the number of frame data of the animation so that a relationship of T3=t3 can be established. The frame data F9 to be inserted may be a copy of the frame data F8 or F10.

The description has been made above of the case where the frame data is not created. However, also in the case where the display image data is not transmitted from the host terminal 10, the frame data sometimes drops out in a similar way to the above. Also in such a case, in a similar way, the playback time can be calculated from the number of frames of the animation data, and frame data can be added.

Moreover, upon receiving data to the effect that the image is not updated from the host terminal 10 in the case where the image is not updated in the host terminal 10, the animation data generation unit 234 inserts null frames as shown by frame data F5 and F6. In such a way, even in the case where the image is not updated, the animation data generation unit 234 can suppress a data size of the animation data 253 while synchronizing the playback time of the animation data 253 and the playback time of the lecturer imaging data 251 with each other in terms of timing. Furthermore, in FIG. 13, the animation data 253 is divided into files of a predetermined size (for example, 5 MBytes or the like).

A description will be made of animation data generation processing performed by the animation data generation unit 234 with reference to FIG. 14. In FIG. 14, for the purpose of explaining the synchronization of the animation data with the lecturer imaging data, partial pieces of lecturer imaging data generation processing performed by the lecturer imaging data generation unit 231 are also described.

In Step S101 in advance, the animation data generation unit 234 initializes the playback time T of the animation data, and starts to acquire the display image data. Meanwhile, the lecturer imaging data generation unit 231 also initializes such an imaging time t of the lecturer imaging data, and starts to generate the lecturer imaging data. Here, the animation data generation processing performed by the animation data generation unit 234 and the lecturer data generation processing performed by the lecturer imaging data generation unit 231 are performed simultaneously with each other together with the start of the lecture by the transmission of the response signal, which is shown in Step S2 of FIG. 6.

In Step S102, the animation data generation unit 234 inquires the display image from the host terminal 10. Here, the inquiry about the display image data in step S102 is executed every predetermined time. In the case where the animation data generation unit 234 has received data to the effect that there is no change in the display image data, the processing proceeds to Step S106, and in the case where the predetermined time has not elapsed, then in Step S102, the animation data generation unit 234 inquires the display image data from the host terminal 10 one more time.

Meanwhile, in the case of having received the display image data in Step S103, then in step S104, the animation data generation unit 234 generates the frame data from the display image data. Moreover, in Step S105, the animation data generation unit 234 generates null frame data according to needs. Specifically, in the case of having received the data to the effect that there is no change in the display image in Step S103 in the previous processing, the animation data generation unit 234 generates the null frame data based on the number of times that the animation data generation unit 234 has received the data concerned to the effect that there is no change. In such a way, the animation data generation unit 234 generates the frame data for the difference data of the image display data, and in addition, the playback timing is not shifted.

When the predetermined time has elapsed in Step S106, the animation data generation unit 234 performs processing for synchronizing the playback time of the animation data and the playback time of the lecturer imaging data with each other. Specifically, in Step S107, the animation data generation unit 234 multiplies the number of data, which is obtained by summing up the number of frame data generated in Step S104 and the number of null frame data generated in Step S105, and the frame rate by each other, and thereby calculates a playback time $\Delta T_i$. Moreover, in Step S108, the animation data generation unit 234 adds a playback time $T(i-1)$ at the point of time when the playback time of the animation data to the playback time of the lecturer imaging data were synchronized with each other and the playback time $\Delta T_i$ calculated in Step S107 by each other, and thereby acquires a playback time $T_i$ of the animation data at the present time.

Meanwhile, in Step S202, the lecturer imaging data generation unit 231 acquires a playback time $t_i$ of the lecturer imaging data at the present time. In Step S109, the animation data generation unit 234 determines whether or not the playback time $T_i$ calculated in Step S108 and the playback time $t_i$ acquired in Step S202 coincide with each other.

Specifically, in the example shown in FIG. 13, in the case where the playback time $T_i$ and the playback time $t_i$ are synchronized with each other at timing when the frame data F10 is generated, the animation data generation unit 234 has generated two frame data from the time T2 for the animation data. Accordingly, $\Delta T3$ is calculated by $2 \cdot n$ (n=frame rate). Here, the time T3 is calculated by $T2+\Delta T3$.

Meanwhile, since the playback time of the lecturer imaging data is acquired as t3, it is determined in Step S109 whether or not the time t3 and the time $T2+\Delta T3$ coincide with each other. Here, since the frame data F9 drops out, the time $\Delta T3$ is calculated as $2 \cdot n$ though originally must have been $3 \cdot n$. Hence, even if the time t3 and the time $T2+\Delta T3$ are compared with each other, the playback time of the animation data is shorter by a time $1 \cdot n$ in comparison with the imaging time of the lecturer imaging data.

In the case where it is determined that the time T3 is equal to the time t3 in Step S109, the processing proceeds to Step S111. Meanwhile, in the case where it is determined that the time T3 is not equal to the time t3 in Step S109, the processing proceeds to Step S110.

In Step S110, the animation data generation unit 234 interpolates frames, of which number is equivalent to $(t_i-T_i)$/frame rate, into the animation data. In the case of the above-described example, $t_i-T_i$ becomes $1 \cdot n$, and accordingly, the animation data generation unit 234 interpolates one piece of the frame data into the animation data. In such a way, the time T3 newly calculated coincides with the time t3, and accordingly, the animation data and the lecturer imaging data can be synchronized with each other.

In the case where an instruction to finish the lecture is not inputted in Step S111, the processing proceeds to Step S102, where the animation data generation unit 234 inquires the display image data from the host terminal 10 one more time. Meanwhile, when the instruction to finish the lecture is inputted in Step S111, the animation data generation unit 234 finishes the processing without doing anything.

The description has been made above of the case where the frame data of the animation data drops out. In the case where the playback time of the animation data is long, the frame data of the animation data is thinned, whereby the animation data and the lecturer imaging data can be synchronized with each other.

(Effects)

As described above, in accordance with the best mode of the present invention, the plurality of data in which how the lecture is going on is acquired by the various means can be displayed on one screen while being synchronized with one another. Accordingly, an e-learning content closer to the actual lecture and having a feeling of presence can be provided. In such a way, it can be expected to maintain motivation of the students and to achieve a high education effect.

Moreover, in general, it takes an enormous time to edit the content, and so on in the event of creating the content for the e-learning; however, in accordance with the best mode of the present invention, the e-learning content can be created in real time only in such a manner that the lecturer gives the lecture while making signals to start and finish the lecture. In such a way, such times required to create and edit the content can be shortened, and a high-quality e-learning content can be provided with ease.

Moreover, in the best mode of the present invention, in particular, the image data displayed on the display device can be animated in real time during the lecture. Heretofore, in the event of recording the content for the e-learning, such recording has only been allowed to go on in accordance with a predetermined lecture schedule, and accordingly, the lecturer has had to give the lecture in accordance with the lecture schedule concerned. However, in accordance with the best mode of the present invention, the lecturer can implement the lecture, for example, while observing reactions of the students who are taking the lecture in the classroom without according to the lecture schedule. In such a way, even in the case of delivering the content by way of the e-learning, the lecture having the feeling of presence can be provided.

Furthermore, in the best mode of the present invention, at the time of creating the content data, the lecture content is recorded as the animation data, and is synchronized with the lecturer imaging data. In such a way, the students can comfortably browse the content data. Moreover, since the content data is composed of the plurality of data, it is possible that the shifts may occur among the respective pieces of data also when the content data is played back. However, in the best mode of the present invention, the respective pieces of data are synchronized with one another also when the content data is played back, and accordingly, the students can comfortably browse the content data.

The invention claimed is:

1. A content generation system that generates, by using a computer, a content regarding a lecture performed by a lecturer, comprising:
   a host terminal which the lecturer operates; and
   a content generation device connected to the host terminal,
   wherein the host terminal includes:
   a lecture material display unit that displays a material of the lecture on a display device;
   a display image transmission unit that transmits display image data displayed on the display device; and
   an index signal transmission unit that transmits an index signal to the content generation device when the lecturer inputs an instruction at a time that defines a break of the lecture during the lecture, and
   the content generation device includes:
   a lecturer imaging data generation unit that sequentially stores lecturer imaging data, in which a lecture scene of the lecturer is imaged, in a storage device of the content generation device;
   an animation data generation unit that generates, in synchronization with the lecturer imaging data, animation data from the display image data received from the host terminal, and stores the generated animation data in the storage device, the animation data generation unit converts the display image data into pieces of frame data and combines pieces of the frame data to generate the animation data; and
   a thumbnail data creation unit that creates an index as a break of the lecturer imaging data and the animation data at the time of receiving the index signal from the index signal transmission unit of the host terminal.

2. The content generation system according to claim 1, wherein the animation data includes a plurality of frame data generated from the display image data sequentially transmitted from the host terminal, and
   the animation data generation unit of the content generation device calculates, at predetermined timing, a playback time of the animation data from the number of converted frame data and a frame rate, adds or deletes the frame data so that the playback time can coincide with a playback time of the lecturer imaging data, and generates the animation data.

3. The content generation system according to claim 2, further comprising:
   a client terminal connected to the content generation device and operated by a student,
   wherein the content generation device further includes:
   a content data transmission unit that reads out the lecturer imaging data and the animation data from the storage device, and transmits content data containing the lecturer imaging data and the animation data to the client terminal,
   the client terminal includes: a content data receiving unit that receives the content data; and
   a content data playback unit that plays back the content data, and outputs the content data to an output device, and
   at a time of playing back the content data, the content data playback unit of the client terminal changes the playback time of the animation data to the playback time of the lecturer imaging data at predetermined timing in a case where the playback time of the lecturer imaging data and the playback time of the animation data are different from each other.

4. The content generation system according to claim 1, further comprising:
   a client terminal connected to the content generation device and operated by a student,
   wherein the content generation device further includes:
   a content data transmission unit that reads out the lecturer imaging data and the animation data from the storage device, and transmits content data containing the lecturer imaging data and the animation data to the client terminal,
   the client terminal includes: a content data receiving unit that receives the content data; and
   a content data playback unit that plays back the content data, and outputs the content data to an output device, and
   at a time of playing back the content data, the content data playback unit of the client terminal changes the playback time of the animation data to the playback time of the lecturer imaging data at predetermined timing in a case where the playback time of the lecturer imaging data and the playback time of the animation data are different from each other.

5. A content generation device that generates, by using a computer, a content regarding a lecture performed by a lecturer, comprising:
- a lecturer imaging data generation unit that sequentially stores lecturer imaging data, in which a lecture scene of the lecturer is imaged, in a storage device thereof;
- an animation data generation unit that receives display image data, which is displayed on a display device of a host terminal which the lecturer operates, from the host terminal, generates animation data from the display image data in synchronization with the lecturer imaging data, and stores the generated animation data in the storage device, the animation data generation unit converts the display image data into pieces of frame data and combines the pieces of the frame data to generate the animation data;
- a content data transmission unit that reads out the lecturer imaging data and the animation data from the storage device, and transmits content data containing the lecturer imaging data and the animation data; and
- a thumbnail data creation unit that creates an index as a break of the lecturer imaging data and the animation data at the time of receiving an index signal transmitted from the host terminal.

6. The content generation device according to claim 5, wherein the animation data includes a plurality of frame data generated from the display image data sequentially transmitted from the host terminal, and
the animation data generation unit calculates, at predetermined timing, a playback time of the animation data from the number of converted frame data and a frame rate, adds or deletes the frame data so that the playback time can coincide with a playback time of the lecturer imaging data, and generates the animation data.

7. A content generation program on a non-transitory computer readable medium, that generates, by using a computer, a content regarding a lecture performed by a lecturer, the content generation program allowing the computer to function as:
- a lecturer imaging data generation unit that sequentially stores lecturer imaging data, in which a lecture scene of the lecturer is imaged, in a storage device thereof;
- an animation data generation unit that receives display image data, which is displayed on a display device of a host terminal which the lecturer operates, from the host terminal, generates animation data from the display image data in synchronization with the lecturer imaging data, and stores the generated animation data in the storage device, the animation data generation unit converts the display image data into pieces of frame data and combines the pieces of the frame data to generate the animation data;
- a content data transmission unit that reads out the lecturer imaging data and the animation data from the storage device, and transmits content data containing the lecturer imaging data and the animation data; and
- a thumbnail data creation unit that creates an index as a break of the lecturer imaging data and the animation data at the time of receiving an index signal from an index signal transmission unit within the host terminal.

8. The content generation program according to claim 7, wherein the animation data includes a plurality of frame data generated from the display image data sequentially transmitted from the host terminal, and
the animation data generation unit calculates, at predetermined timing, a playback time of the animation data from the number of converted frame data and a frame rate, adds or deletes the frame data so that the playback time can coincide with a playback time of the lecturer imaging data, and generates the animation data.

* * * * *